United States Patent
Singh et al.

(10) Patent No.: US 10,665,354 B2
(45) Date of Patent: May 26, 2020

(54) LOSS-OF-COOLANT ACCIDENT REACTOR COOLING SYSTEM

(71) Applicant: SMR Inventec, LLC, Camden, NJ (US)

(72) Inventors: Krishna P. Singh, Hobe Sound, FL (US); Joseph Rajkumar, Cherry Hill, NJ (US)

(73) Assignee: SMR INVENTEC, LLC, Camden, NJ (US)

( * ) Notice: Subject to any disclaimer, the term of this patent is extended or adjusted under 35 U.S.C. 154(b) by 0 days.

(21) Appl. No.: 15/901,249

(22) Filed: Feb. 21, 2018

(65) Prior Publication Data
US 2018/0254113 A1 Sep. 6, 2018

Related U.S. Application Data

(63) Continuation of application No. 14/289,545, filed on May 28, 2014, now Pat. No. 10,096,389, which is a
(Continued)

(51) Int. Cl.
*G21C 15/18* (2006.01)
*G21C 13/02* (2006.01)
(Continued)

(52) U.S. Cl.
CPC ............ *G21C 15/18* (2013.01); *G21C 13/02* (2013.01); *G21C 15/12* (2013.01); *G21D 1/006* (2013.01);
(Continued)

(58) Field of Classification Search
CPC ........ G21C 15/18; G21C 13/00; G21C 13/02; G21C 15/12; G21C 9/004
See application file for complete search history.

(56) References Cited

U.S. PATENT DOCUMENTS

| | | | |
|---|---|---|---|
| 2,890,009 A | 6/1959 | Chapellier | |
| 3,320,969 A | 5/1967 | Gordon | |

(Continued)

FOREIGN PATENT DOCUMENTS

| | | |
|---|---|---|
| CN | 87106445 | 4/1988 |
| CN | 101836262 | 9/2010 |

(Continued)

OTHER PUBLICATIONS

Office Action in Corresponding JP Application No. 2016-516794, dated Apr. 3, 2018. JP.

(Continued)

*Primary Examiner* — Lily C Garner
(74) *Attorney, Agent, or Firm* — The Belles Group, P.C.

(57) ABSTRACT

A nuclear reactor cooling system with passive cooling capabilities operable during a loss-of-coolant accident (LOCA) without available electric power. The system includes a reactor vessel with nuclear fuel core located in a reactor well. An in-containment water storage tank is fluidly coupled to the reactor well and holds an inventory of cooling water. During a LOCA event, the tank floods the reactor well with water. Eventually, the water heated by decay heat from the reactor vaporizes producing steam. The steam flows to an in-containment heat exchanger and condenses. The condensate is returned to the reactor well in a closed flow loop system in which flow may circulate solely via gravity from changes in phase and density of the water. In one embodiment, the heat exchanger may be an array of heat dissipater ducts mounted on the wall of the inner containment vessel surrounded by a heat sink.

20 Claims, 19 Drawing Sheets

Related U.S. Application Data continuation-in-part of application No. PCT/US2013/042070, filed on May 21, 2013.

(60) Provisional application No. 61/828,017, filed on May 28, 2013, provisional application No. 61/649,593, filed on May 21, 2012.

(51) Int. Cl.
  *G21C 15/12* (2006.01)
  *G21D 1/00* (2006.01)
  *G21C 9/004* (2006.01)

(52) U.S. Cl.
  CPC .............. *G21C 9/004* (2013.01); *G21D 1/00* (2013.01); *Y02E 30/40* (2013.01)

(56) References Cited

U.S. PATENT DOCUMENTS

| | | | |
|---|---|---|---|
| 3,367,839 A * | 2/1968 | Chinaglia | G21C 1/32 376/285 |
| 3,563,855 A | 2/1971 | Marko | |
| 3,718,539 A * | 2/1973 | West | G21C 9/00 376/283 |
| 3,888,730 A | 6/1975 | Jackson | |
| 3,929,567 A | 12/1975 | Schabert et al. | |
| 4,080,256 A | 3/1978 | Braun et al. | |
| 4,175,005 A | 11/1979 | Harstead | |
| 4,478,784 A | 10/1984 | Burelbach | |
| 4,508,677 A | 4/1985 | Craig et al. | |
| 4,678,626 A | 7/1987 | Germer | |
| 4,747,993 A * | 5/1988 | Hankinson | G21C 13/028 220/378 |
| 4,752,439 A | 6/1988 | Elter et al. | |
| 4,765,946 A | 8/1988 | Dagard et al. | |
| 5,011,652 A * | 4/1991 | Tominaga | G21C 15/18 376/282 |
| 5,043,135 A | 8/1991 | Hunsbedt et al. | |
| 5,049,353 A | 9/1991 | Conway et al. | |
| 5,087,408 A | 2/1992 | Tominaga et al. | |
| 5,091,143 A | 2/1992 | Tate et al. | |
| 5,096,659 A | 3/1992 | Hidaka et al. | |
| 5,154,877 A | 10/1992 | Schultz et al. | |
| 5,217,682 A | 6/1993 | Spinks | |
| 5,272,737 A | 12/1993 | Fujii et al. | |
| 5,282,230 A | 1/1994 | Billig et al. | |
| 5,345,481 A | 9/1994 | Oosterkamp | |
| 5,345,482 A | 9/1994 | Conway et al. | |
| 5,349,616 A | 9/1994 | Nakayama et al. | |
| 5,426,681 A * | 6/1995 | Aburomia | G21C 9/004 376/282 |
| 5,442,668 A | 8/1995 | Todreas et al. | |
| 5,499,277 A | 3/1996 | Hunsbedt | |
| 5,612,982 A * | 3/1997 | Woodcock | G21C 15/18 376/298 |
| 5,642,389 A * | 6/1997 | Mattern | G21C 9/02 376/219 |
| 6,718,001 B2 | 4/2004 | Hidaka et al. | |
| 8,687,759 B2 | 4/2014 | Reyes, Jr. et al. | |
| 8,721,982 B2 | 5/2014 | Yamazumi et al. | |
| 2002/0044623 A1 | 4/2002 | Manabe et al. | |
| 2002/0101951 A1 | 8/2002 | Nakamaru et al. | |
| 2009/0129531 A1 | 5/2009 | Reyes, Jr. et al. | |
| 2009/0323884 A1 * | 12/2009 | Sato | G21C 13/00 376/283 |
| 2010/0260302 A1 | 10/2010 | Pelisson | |
| 2011/0158371 A1 | 6/2011 | Sato et al. | |
| 2011/0314858 A1 | 12/2011 | Tahara et al. | |
| 2012/0076255 A1 | 3/2012 | Jain et al. | |
| 2012/0121056 A1 * | 5/2012 | Sato | G21C 9/004 376/280 |
| 2012/0207260 A1 | 8/2012 | Houghton et al. | |
| 2013/0051511 A1 | 2/2013 | Watson et al. | |
| 2013/0272474 A1 | 10/2013 | Conway et al. | |

FOREIGN PATENT DOCUMENTS

| | | |
|---|---|---|
| CN | 101884073 | 11/2010 |
| CN | 102194533 | 9/2011 |
| CN | 202549316 | 11/2012 |
| CN | 102867550 | 1/2013 |
| CN | 102903404 | 1/2013 |
| CN | 103000233 | 3/2013 |
| CN | 202948738 | 5/2013 |
| DE | 2642352 | 3/1978 |
| DE | 3517632 | 11/1986 |
| DE | 19703441 | 8/1998 |
| EP | 0232186 | 4/1991 |
| EP | 0528672 | 2/1993 |
| EP | 0734028 | 9/1996 |
| JP | 36-001188 | 3/1961 |
| JP | S62187291 | 8/1987 |
| JP | S63217296 | 9/1988 |
| JP | H02176496 | 7/1990 |
| JP | H02296196 | 12/1990 |
| JP | H03018793 | 1/1991 |
| JP | H04125495 | 4/1992 |
| JP | H05087967 | 4/1993 |
| JP | H07-181279 | 7/1995 |
| JP | H07198885 | 8/1995 |
| JP | H10-90468 | 4/1998 |
| JP | 2004245763 | 9/2004 |
| JP | 2006510117 | 3/2006 |
| JP | 2006138744 | 6/2006 |
| JP | 2007297854 | 11/2007 |
| JP | 2009150846 | 7/2009 |
| JP | 2010203858 | 9/2010 |
| JP | 2010236885 | 10/2010 |
| JP | 2011501811 | 1/2011 |
| JP | 2011503614 | 1/2011 |
| JP | 2011232179 | 11/2011 |
| JP | 2012198168 | 10/2012 |
| RU | 2073920 | 2/1997 |
| RU | 2271585 | 3/2006 |
| WO | WO2009064654 | 5/2009 |
| WO | WO2013177196 | 11/2013 |

OTHER PUBLICATIONS

Chung, Young-Jong, et al. "Passive cooldown performance of a 65 MW integral reactor." Nuclear Engineering and Design 238.7 (2008): 1681-1689.
Corresponding Chinese Office Action dated Nov. 14, 2016.
Corresponding International Search Report and Written Opinion of PCT/US2014/039842 dated Oct. 9, 2014.
Corresponding Japanese Office Action dated Oct. 21, 2016.
Corresponding Office Action issued by the JPO dated Nov. 27, 2015.
Corresponding Supplementary European Search Report for EP 13793498 dated Jun. 16, 2016.
Corresponding Supplementary European Search Report for EP14803488 dated Feb. 17, 2017.
International Search Report for International Application No. PCT/US2014/039842 dated Oct. 9, 2014.
International Search Report for International Application No. PCT/US2013/42070 dated Sep. 30, 2013.

* cited by examiner

LOSS-OF-COOLANT ACCIDENT REACTOR COOLING SYSTEM

CROSS-REFERENCE TO RELATED PATENT APPLICATIONS

The present application is a continuation of U.S. patent application Ser. No. 14/289,545 filed May 28, 2014 which claims the benefit of U.S. Provisional Patent Application No. 61/828,017 filed May 28, 2013. U.S. patent application Ser. No. 14/289,545 is further a continuation-in-part of International Patent Application No. PCT/US13/42070 filed May 21, 2013, which claims of benefit of U.S. Provisional Patent Application No. 61/649,593 filed May 21, 2012. The entireties of the foregoing application are incorporated herein by reference.

FIELD OF THE INVENTION

The present invention relates nuclear reactors, and more particularly to a passive cooling system for use in the event of a loss-of-coolant accident and a reactor shutdown.

BACKGROUND OF THE INVENTION

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can generally be of two types.

One thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

Loss-of-Cooling Accident (LOCA) is another type of thermal event condition in which a breach in the pressure containment boundary of reactor coolant system (RCS) leads to a rapid release of flashing water into the containment space. The reactor coolant (primary coolant), suddenly depressurized, would violently flash resulting in a rapid rise of pressure and temperature in the containment space. The in-containment space is rendered into a mixture of air and steam. LOCA events are usually postulated to occur due to a failure in an RCS system pipe containing the primary coolant water. The immediate consequence of a LOCA is rapid depressurization of the RCS and spillage of large quantities of the primary coolant water until the pressure inside the RCS and in the containment reach equilibrium. Nuclear plants are designed to scram immediately in the wake of the RCS depressurization which suppresses the reactor's criticality and stops the chain reaction. However, the large enthalpy of the primary coolant water spilling from the RCS into the containment and the ongoing generation of decay heat in the core are sources of energy that would cause a spike in the containment pressure which, if sufficiently high, may threaten its pressure retention capacity.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also unfortunately a good insulator of heat, requiring pumped heat rejection systems (employ heat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps. The above weaknesses in the state-of-the-art call for an improved nuclear reactor containment system.

What is needed is an efficient energy expulsion system to bring the internal pressure in the containment in the wake of a LOCA to normal condition in as short a time as possible. To ensure that such a system would render its intended function without fail, it is further desirable that it be gravity operated (i.e., the system does not rely on an available power source to drive any pumps or motors).

SUMMARY OF THE INVENTION

A passive nuclear reactor cooling system for use in the event of a loss-of-coolant accident (LOCA) and complete reactor shutdown is provided that overcomes the foregoing drawbacks. The cooling system is configured to create a completely passive means to reject the reactor's decay heat without any reliance on and drawbacks of pumps and motors requiring an available electric power supply. In one embodiment, the cooling system relies entirely on gravity and varying fluid densities to extract and induce flow of cooling water through the system which includes a heat exchanger. The cooling system is engineered to passively extract decay heat from the reactor in the event of a LOCA station black out or another postulated accident scenario wherein the normal heat rejection path for the nuclear fuel core is lost such as via a ruptured pipe in the primary coolant piping or other event.

In one configuration, the passive cooling system utilizes the reserve cooling water in the reactor well as a vehicle to extract and reject decay heat from the reactor via a heat exchanger attached to the reactor containment vessel walls. The cooling water flows via gravity in a closed flow loop between the reactor well and the heat exchanger to reject heat through the containment vessel walls to an external heat sink. In one embodiment, the heat sink may be an annular reservoir filled with cooling water that surrounds the containment vessel.

In further embodiments, as further described herein, an in-containment auxiliary reservoir (e.g. storage tank) of cooling water may be provided which is fluidly coupled to the reactor well to provide a supplemental source or reserve of cooling water. The cooling system closed flow loop may circulate cooling water between both the reactor well and auxiliary reservoir heat exchanger and the heat exchanger.

In one embodiment, a passive reactor cooling system usable after a loss-of-coolant accident includes a containment vessel in thermal communication with a heat sink, a reactor well disposed in the containment vessel, a reactor vessel disposed at least partially in the reactor well, the reactor vessel containing a nuclear fuel core which heats primary coolant in the reactor vessel, a water storage tank disposed in the containment vessel and in fluid communication with the reactor well, the tank containing an inventory of cooling water, and a heat exchanger disposed in the containment vessel, the heat exchanger in fluid communication with the reactor well via a closed flow loop. Following a loss of primary coolant, the tank is configured and operable to flood the reactor well with cooling water which is converted into steam by heat from the fuel core and flows through the closed flow loop to the heat exchanger. In one embodiment, the steam condenses in the heat exchanger forming condensate, and the condensate flows via gravity back to the reactor well.

The heat exchanger comprises an array of heat dissipater ducts integrally attached to the containment vessel in one embodiment.

In another embodiment, a passive reactor cooling system usable after a loss-of-coolant accident includes a containment vessel in thermal communication with a heat sink, a reactor well disposed in the containment vessel, a reactor vessel disposed at least partially in the reactor well, the reactor vessel containing a nuclear fuel core and primary coolant heated by the fuel core, a water storage tank disposed in the containment vessel and in fluid communication with the reactor well, the tank containing an inventory of cooling water, and a heat exchanger disposed in the containment vessel, the heat exchanger in fluid communication with the reactor well via an atmospheric pressure closed flow loop. Following a loss of primary coolant, the tank is configured and operable to flood the reactor well with cooling water. The cooling water in the flooded reactor well is heated by the fuel core and converted into steam, the steam flows through the closed flow loop to the heat exchanger and condenses forming condensate, and the condensate flows back to the reactor well. The heat exchanger comprises an array of heat dissipater ducts integrally attached to the containment vessel in one embodiment.

A method for passively cooling a nuclear reactor after a loss-of-coolant accident is provided. The method includes: locating a reactor vessel containing a nuclear fuel core and primary coolant in a reactor well disposed inside a containment vessel; at least partially filling a water storage tank fluidly coupled to the reactor well with cooling water; releasing cooling water from the water storage tank into the reactor well; heating the cooling water with the fuel core; converting the cooling water at least partially into steam; accumulating the steam in the reactor well; flowing the steam through a heat exchanger; condensing the steam forming condensate in the heat exchanger; and returning the condensate to the reactor well, wherein the coolant steam and condensate circulates through a closed flow loop between the heat exchanger and reactor well. In one embodiment, the steam is produced within an insulating liner assembly disposed on an outside surface of the reactor vessel, the liner assembly being fluidly coupled to the reactor well via flow-hole nozzles disposed at the bottom and top portions of the reactor vessel. The liner assembly may comprise a plurality of spaced apart liners. The condensing step may further include the heat exchanger rejecting heat from the steam to an annular reservoir holding water that surrounds the containment vessel. The heat exchanger may comprises an array of heat dissipater ducts integrally attached to the containment vessel adjacent the annular reservoir.

According to other aspects of the disclosure, the present invention further provides nuclear reactor containment system that overcomes the deficiencies of the foregoing arrangements for rejecting heat released into the environment within the containment by a thermal event. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat energy from the containment space. In the event of a thermal energy release incident inside the containment vessel, heat generated by the containment vessel is transferred to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding outwards from the containment vessel and located in the annulus. In the event of a thermal energy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel and water in the annulus is substantially depleted by evaporation, the air cooling system is operable to draw outside ambient air into the annulus through the air conduits to cool the heat generated in the containment (which decreases exponentially with time) by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

BRIEF DESCRIPTION OF THE DRAWINGS

The features of the illustrative embodiments of the present invention will be described with reference to the following drawings, where like elements are labeled similarly, and in which:

All drawings are schematic and not necessarily to scale. References herein to a single drawing figure (e.g. FIG. 22) which has associated sub-parts (e.g. FIGS. 22A and 22B) shall be construed as a reference to the figure and sub-parts unless otherwise indicated.

DETAILED DESCRIPTION OF THE EMBODIMENTS

Figure 1:
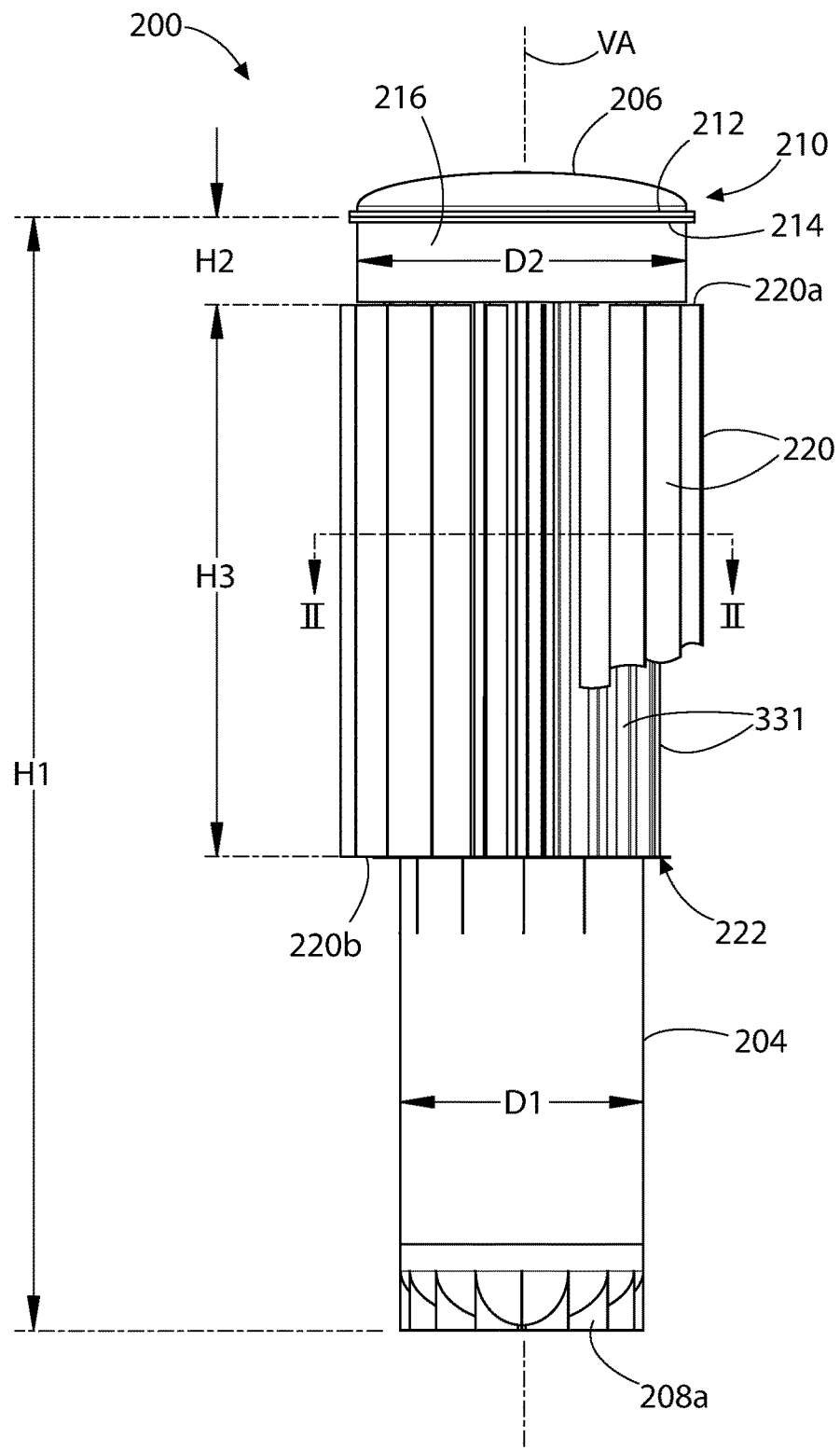
FIG. 1 is side elevation view of a finned primary reactor containment vessel according to the present disclosure which forms part of a nuclear reactor containment system, the lower portions of some fins being broken away in part to reveal vertical support columns and circumferential rib.

The features and benefits of the invention are illustrated and described herein by reference to illustrative embodiments. This description of illustrative embodiments is intended to be read in connection with the accompanying drawings, which are to be considered part of the entire written description. Accordingly, the disclosure expressly should not be limited to such illustrative embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the nominal orientation as then described or as shown in the drawing under discussion. These relative terms are for convenience of description only and do not require that the apparatus be constructed or operated in a rigorously specific orientation denoted by the term. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIGS. 1-15, a nuclear reactor containment system 100 according to the present disclosure is shown. The system 100 generally includes an inner containment structure such as containment vessel 200 and an outer containment enclosure structure (CES) 300 collectively defining a containment vessel-enclosure assembly 200-300. The containment vessel 200 and containment enclosure structure (CES) 300 are vertically elongated and oriented, and define a vertical axis VA.

Figure 6:
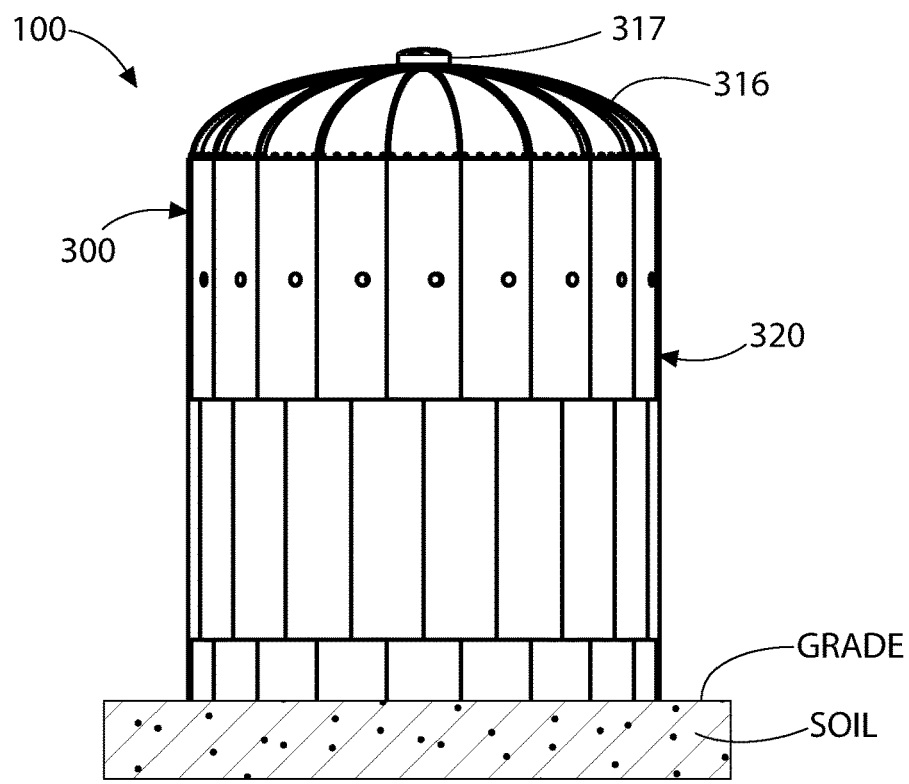
FIG. 6 is a side elevation view of nuclear reactor containment system as installed with the outer containment enclosure structure (CES) being visible above grade.
Figure 7:
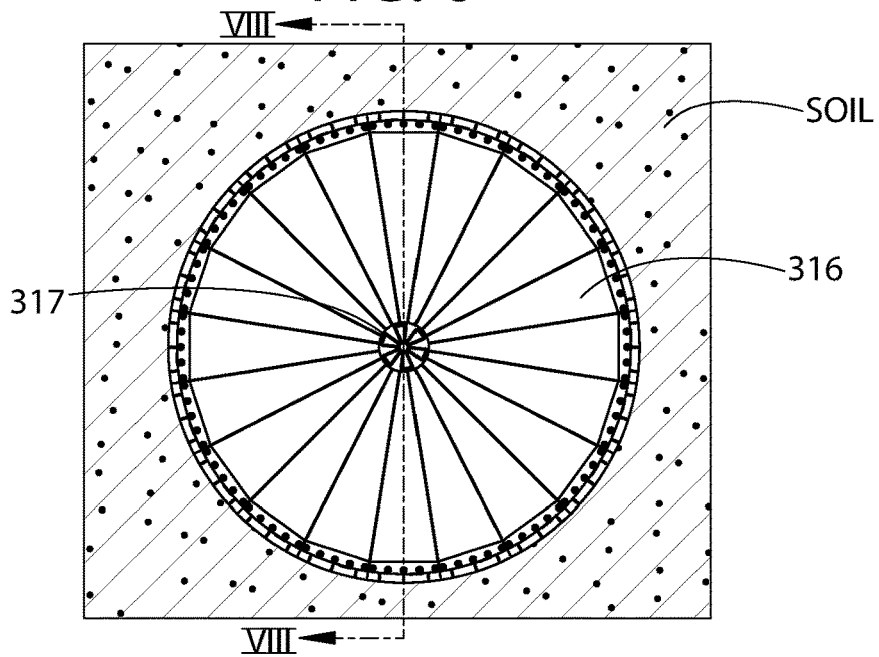
FIG. 7 is a top plan view thereof.
Figure 8:
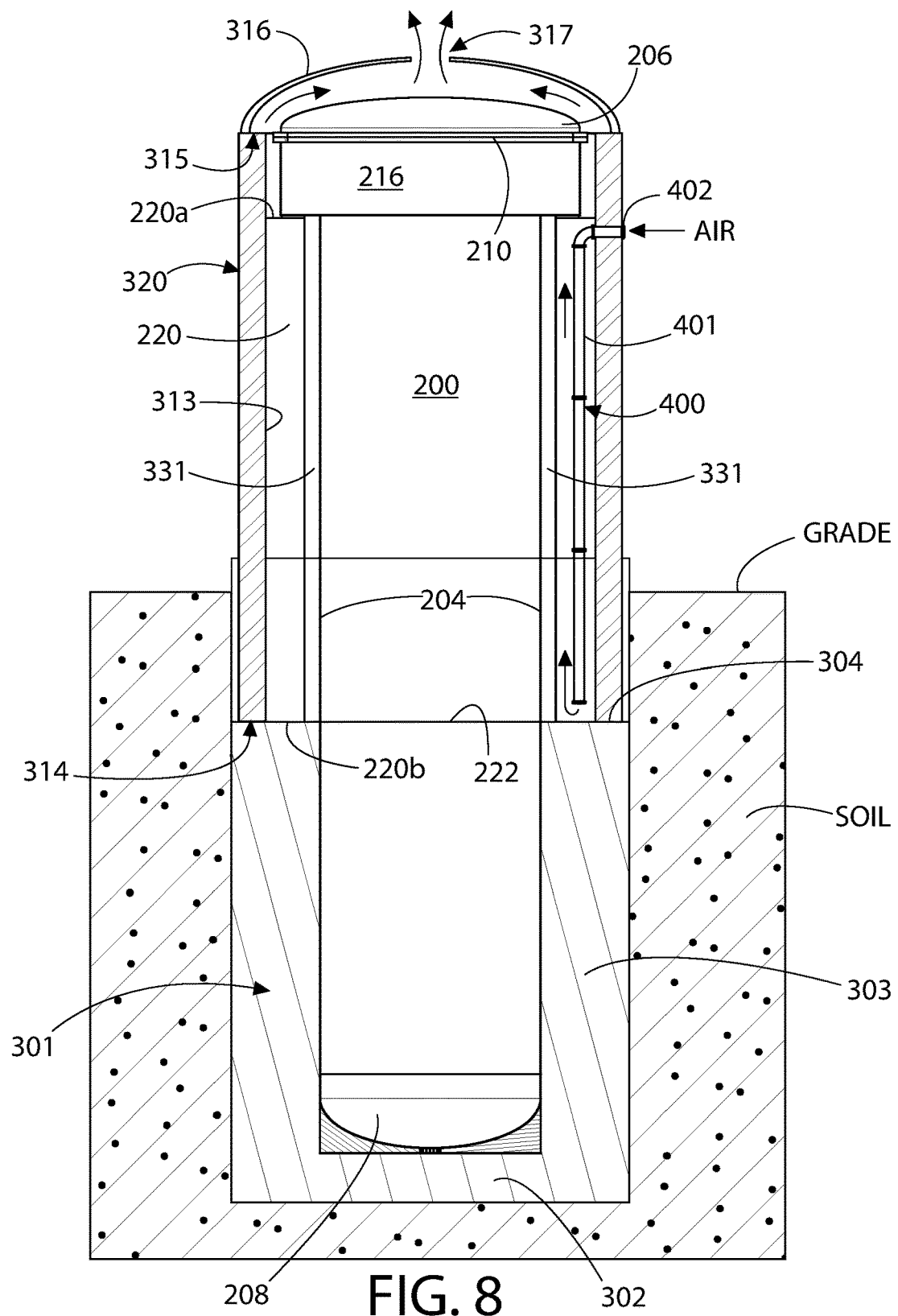
FIG. 8 is longitudinal cross-sectional view thereof taken along line VIII-VIII in FIG. 7 showing both above and below grade portions of the nuclear reactor containment system.
Figures 9, 10:
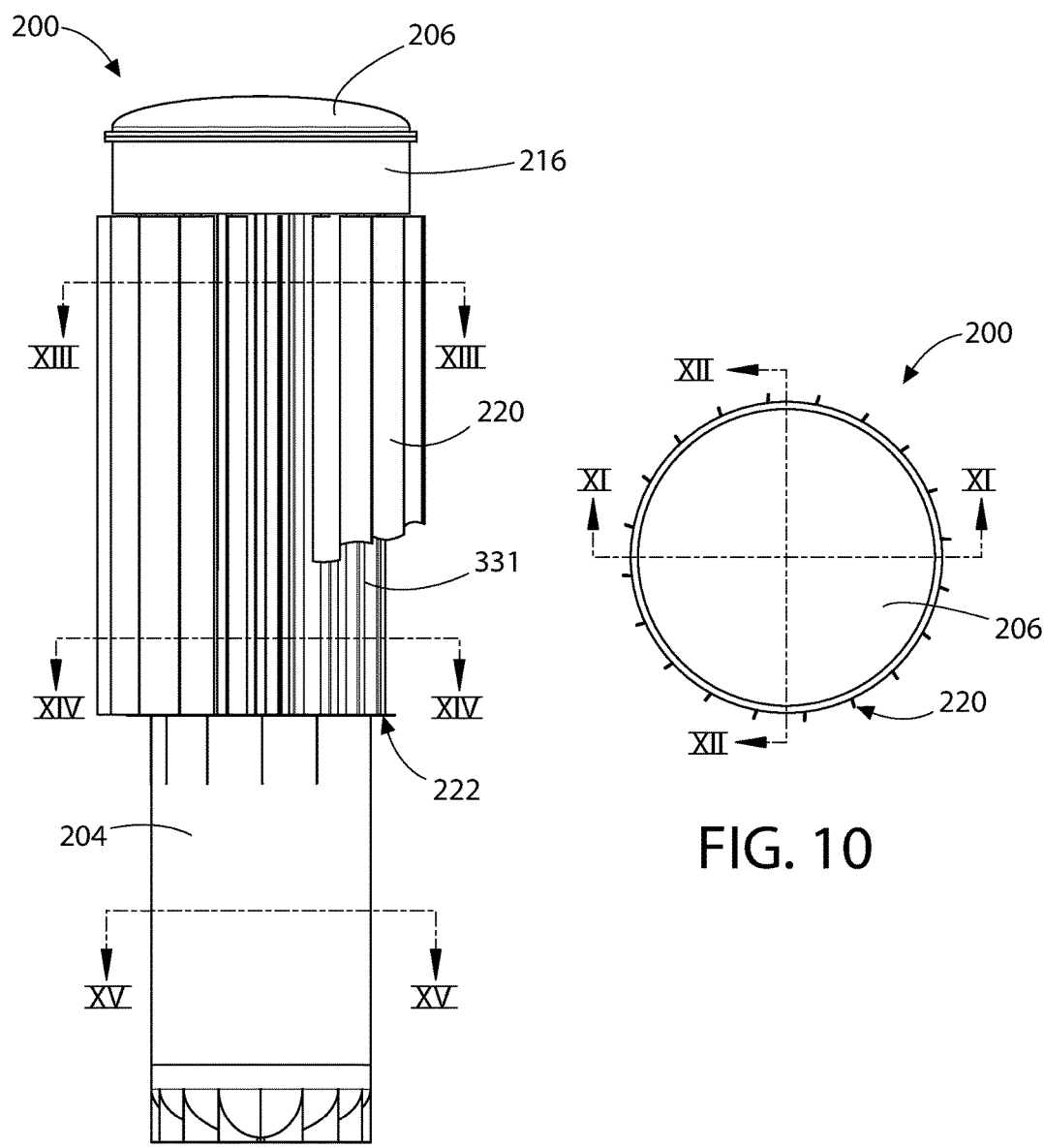
FIG. 9 is side elevation view of the primary reactor containment vessel showing various cross-section cuts to reveal equipment housed in and additional details of the containment vessel.
FIG. 10 is a top plan view thereof.

In one embodiment, the containment vessel-enclosure assembly 200-300 is configured to be buried in the subgrade at least partially below grade (see also FIGS. 6-8). The containment vessel-enclosure assembly 200-300 may be supported by a concrete foundation 301 comprised of a bottom slab 302 and vertically extending sidewalls 303 rising from the slab forming a top base mat 304. The sidewalls 303 may circumferentially enclose containment vessel 200 as shown wherein a lower portion of the containment vessel may be positioned inside the sidewalls. In some embodiments, the sidewalls 303 may be poured after placement of the containment vessel 200 on the bottom slab 302 (which may be poured and set first) thereby completely embedding the lower portion of the containment vessel 200 within the foundation. The foundation walls 303 may terminate below grade in some embodiments as shown to provide additional protection for the containment vessel-enclosure assembly 200-300 from projectile impacts (e.g. crashing plane, etc.). The foundation 301 may have any suitable configuration in top plan view, including without limitation polygonal (e.g. rectangular, hexagon, circular, etc.).

In one embodiment, the weight of the containment vessel 200 may be primarily supported by the bottom slab 302 on which the containment vessel rests and the containment enclosure structure (CES) 300 may be supported by the base mat 304 formed atop the sidewalls 303 of the foundation 301. Other suitable vessel and containment enclosure structure (CES) support arrangements may be used.

With continuing reference to FIGS. 1-15, the containment structure vessel 200 may be an elongated vessel including a hollow cylindrical shell 204 with circular transverse cross-section defining an outer diameter D1, a top head 206, and a bottom head 208. In one embodiment, the containment vessel 200 (i.e. shell and heads) may be made from a suitably strong and ductile metallic plate and bar stock that is readily weldable (e.g. low carbon steel). In one embodiment, a low carbon steel shell 204 may have a thickness of at least 1 inch. Other suitable metallic materials including various alloys may be used.

The top head 206 may be attached to the shell 204 via a flanged joint 210 comprised of a first annular flange 212 disposed on the lower end or bottom of the top head and a second mating annular flange 214 disposed on the upper end or top of the shell. The flanged joint 210 may be a bolted joint, which optionally may further be seal welded after assembly with a circumferentially extending annular seal weld being made between the adjoining flanges 212 and 214.

The top head 206 of containment vessel 200 may be an ASME (American Society of Mechanical Engineers) dome-shaped flanged and dished head to add structural strength (i.e. internal pressure retention and external impact resistance); however, other possible configurations including a flat top head might be used. The bottom head 208 may similarly be a dome-shaped dished head or alternatively flat in other possible embodiments. In one containment vessel construction, the bottom head 208 may be directly welded to the lower portion or end of the shell 204 via an integral straight flange (SF) portion of the head matching the diameter of shell. In one embodiment, the bottom of the containment vessel 200 may include a ribbed support stand 208a or similar structure attached to the bottom head 208 to help stabilize and provide level support for the containment vessel on the slab 302 of the foundation 301, as further described herein.

In some embodiments, the top portion 216 of the containment vessel shell 204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 200 making the containment vessel structure compact. In one configuration, therefore, the above grade portion of the containment vessel 200 may resemble a mushroom-shaped structure.

In one possible embodiment, the enlarged top portion 216 of containment vessel 200 may have an outer diameter D2 that is larger than the outer diameter D1 of the rest of the adjoining lower portion 218 of the containment vessel shell 204. In one non-limiting example, the top portion 216 may have a diameter D2 that is approximately 10 feet larger than the diameter D1 of the lower portion 218 of the shell 204. The top portion 216 of shell 204 may have a suitable height H2 selected to accommodate the polar crane with allowance for working clearances which may be less than 50% of the total height H1 of the containment vessel 200. In one non-limiting example, approximately the top ten feet of the containment vessel 200 (H2) may be formed by the enlarged diameter top portion 216 in comparison to a total height H1 of 200 feet of the containment vessel. The top portion 216 of containment vessel 200 may terminate at the upper end with flange 214 at the flanged connection to the top head 206 of the containment vessel.

Figure 4:
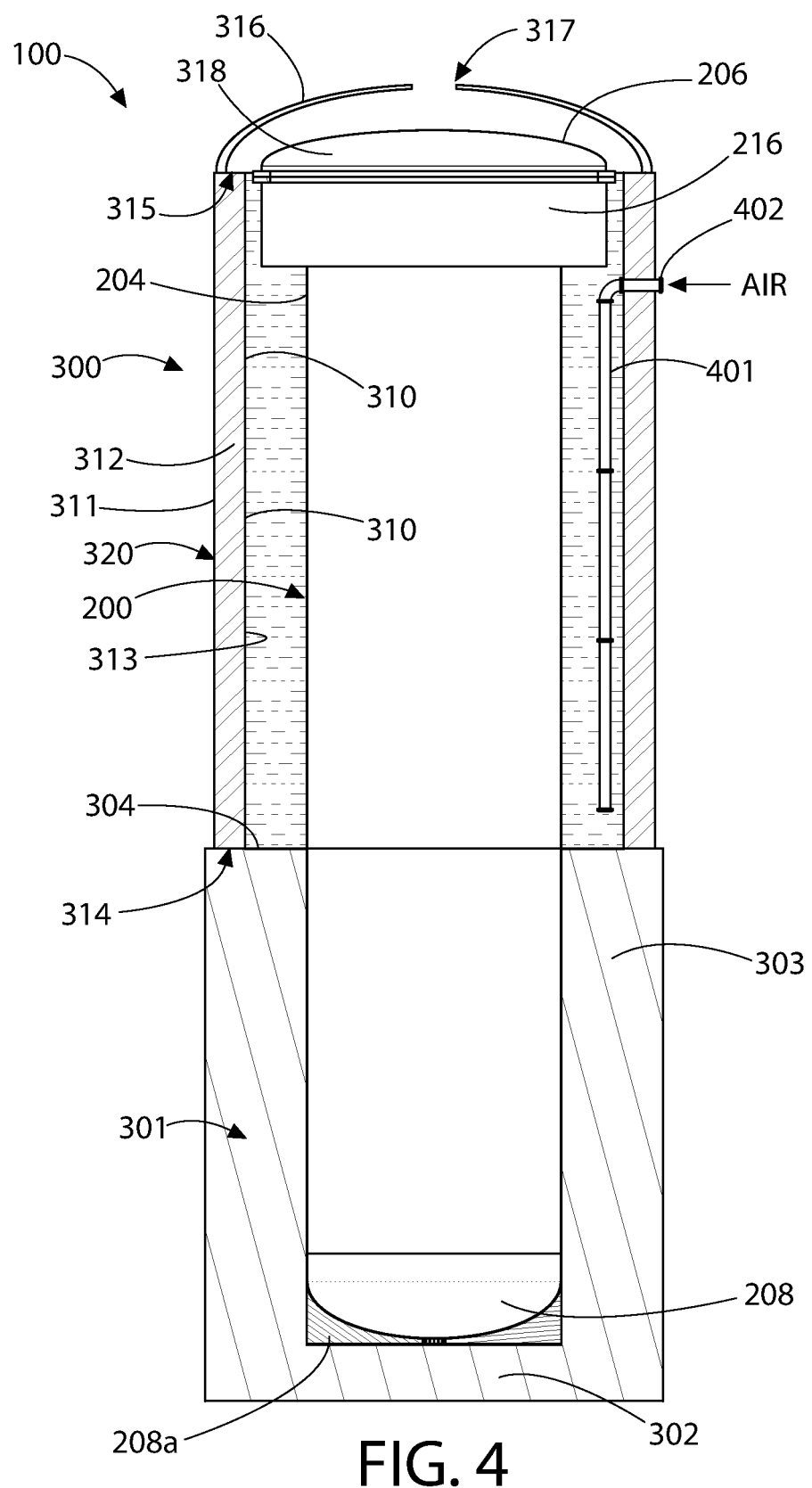
FIG. 4 is a longitudinal cross-sectional view of the nuclear reactor containment system showing the containment vessel of FIG. 1 and outer containment enclosure structure (CES) with water filled annular reservoir formed between the vessel and enclosure.

In one embodiment, the diametrically enlarged top portion 216 of containment vessel 200 has a diameter D2 which is smaller than the inside diameter D3 of the containment enclosure structure (CES) 300 to provide a (substantially) radial gap or secondary annulus 330 (see, e.g. FIG. 4). This provides a cushion of space or buffer region between the containment enclosure structure (CES) 300 and containment vessel top portion 216 in the advent of a projectile impact on the containment enclosure structure (CES). Furthermore, the annulus 330 further significantly creates a flow path between primary annulus 313 (between the shells of the containment enclosure structure (CES) 300 and containment vessel 200) and the head space 318 between the containment enclosure structure (CES) dome 316 and top head 206 of the containment vessel 200 for steam and/or air to be vented from the containment enclosure structure (CES) as further described herein. Accordingly, the secondary annulus 330 is in fluid communication with the primary annulus 313 and the head space 318 which in turn is in fluid communication with vent 317 which penetrates the dome 316. In one embodiment, the secondary annulus 330 has a smaller (substantially) radial width than the primary annulus 313.

Referring to FIGS. 1-4, the containment enclosure structure (CES) 300 may be double-walled structure in some embodiments having sidewalls 320 formed by two (substantially) radially spaced and interconnected concentric shells 310 (inner) and 311 (outer) with plain or reinforced concrete 312 installed in the annular space between them. The concentric shells 310, 311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CES) 300 may have a concrete 312 thickness of 6 feet or more which ensures adequate ability to withstand high energy projectile impacts such as that from an airliner.

The containment enclosure structure (CES) 300 circumscribes the containment vessel shell 204 and is spaced (substantially) radially apart from shell 204, thereby creating primary annulus 313. Annulus 313 may be a water-filled in one embodiment to create a heat sink for receiving and dissipating heat from the containment vessel 200 in the case of a thermal energy release incident inside the containment vessel. This water-filled annular reservoir preferably extends circumferentially for a full 360 degrees in one embodiment around the perimeter of upper portions of the containment vessel shell 204 lying above the concrete foundation 301. FIG. 4 shows a cross-section of the water-filled annulus 313 without the external (substantially) radial fins 221 in this figure for clarity. In one embodiment, the annulus 313 is filled with water from the base mat 304 at the bottom end 314 to approximately the top end 315 of the concentric shells 310, 311 of the containment enclosure structure (CES) 300 to form an annular cooling water reservoir between the containment vessel shell 204 and inner shell 310 of the containment enclosure structure (CES). This annular reservoir may be coated or lined in some embodiments with a suitable corrosion resistant material such as aluminum, stainless steel, or a suitable preservative for corrosion protection. In one representative example, without limitation, the annulus 313 may be about 10 feet wide and about 100 feet high.

In one embodiment, the containment enclosure structure (CES) 300 includes a steel dome 316 that is suitably thick and reinforced to harden it against crashing aircraft and other incident projectiles. The dome 316 may be removably fastened to the shells 310, 311 by a robust flanged joint 318. In one embodiment, the containment enclosure structure (CES) 300 is entirely surrounded on all exposed above grade portions by the containment enclosure structure (CES) 300, which preferably is sufficiently tall to provide protection for the containment vessel against aircraft hazard or comparable projectile to preserve the structural integrity of the water mass in the annulus 313 surrounding the containment vessel. In one embodiment, as shown, the containment enclosure structure (CES) 300 extends vertically below grade to a substantial portion of the distance to the top of the base mat 304.

The containment enclosure structure (CES) 300 may further include at least one rain-protected vent 317 which is in fluid communication with the head space 318 beneath the dome 316 and water-filled annulus 313 to allow water vapor to flow, escape, and vent to atmosphere. In one embodiment, the vent 317 may be located at the center of the dome 316. In other embodiments, a plurality of vents may be provided spaced (substantially) radially around the dome 316. The vent 317 may be formed by a short section of piping in some embodiments which is covered by a rain hood of any suitable configuration that allows steam to escape from the containment enclosure structure (CES) but minimizes the ingress of water.

In some possible embodiments, the head space 318 between the dome 316 and top head 206 of the containment vessel 200 may be filled with an energy absorbing material or structure to minimize the impact load on the containment enclosure structure (CES) dome 316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 316.

Referring primarily to FIGS. 1-5 and 8-17, the buried portions of the containment vessel 200 within the concrete foundation 301 below the base mat 304 may have a plain shell 204 without external features. Portions of the containment vessel shell 204 above the base mat 304, however, may include a plurality of longitudinal external (substantially) radial ribs or fins 220 which extend axially (substantially) parallel to vertical axis VA of the containment vessel-enclosure assembly 200-300. The external longitudinal fins 220 are spaced circumferentially around the perimeter of the containment vessel shell 204 and extend (substantially) radially outwards from the containment vessel.

The ribs 220 serve multiple advantageous functions including without limitation (1) to stiffen the containment vessel shell 204, (2) prevent excessive "sloshing" of water reserve in annulus 313 in the occurrence of a seismic event, and (3) significantly to act as heat transfer "fins" to dissipate heat absorbed by conduction through the shell 204 to the environment of the annulus 313 in the situation of a fluid/steam release event in the containment vessel.

Accordingly, in one embodiment to maximize the heat transfer effectiveness, the longitudinal fins 220 extend vertically for substantially the entire height of the water-filled annulus 313 covering the effective heat transfer surfaces of the containment vessel 200 (i.e. portions not buried in concrete foundation) to transfer heat from the containment vessel 200 to the water reservoir, as further described herein. In one embodiment, the external longitudinal fins 220 have upper horizontal ends 220a which terminate at or proximate to the underside or bottom of the larger diameter top portion 216 of the containment vessel 200, and lower horizontal ends 220b which terminate at or proximate to the base mat 304 of the concrete foundation 301. In one embodiment, the external longitudinal fins 220 may have a height H3 which is equal to or greater than one half of a total height of the shell of the containment vessel.

In one embodiment, the upper horizontal ends 220a of the longitudinal fins 220 are free ends not permanently attached (e.g. welded) to the containment vessel 200 or other structure. At least part of the lower horizontal ends 220b of the longitudinal fins 220 may abuttingly contact and rest on a horizontal circumferential rib 222 welded to the exterior surface of the containment vessel shell 204 to help support the weight of the longitudinal fins 220 and minimize stresses on the longitudinal rib-to-shell welds. Circumferential rib 222 is annular in shape and may extend a full 360 degrees completely around the circumferential of the containment vessel shell 204. In one embodiment, the circumferential rib 222 is located to rest on the base mat 304 of the concrete foundation 301 which transfers the loads of the longitudinal fins 220 to the foundation. The longitudinal fins 220 may have a lateral extent or width that projects outwards beyond the outer peripheral edge of the circumferential rib 222. Accordingly, in this embodiment, only the inner portions of the lower horizontal end 220b of each rib 220 contacts the circumferential rib 222. In other possible embodiments, the circumferential rib 222 may extend (substantially) radially outwards far enough so that substantially the entire lower horizontal end 220b of each longitudinal rib 220 rests on the circumferential rib 222. The lower horizontal ends 220b may be welded to the circumferential rib 222 in some embodiments to further strengthen and stiffen the longitudinal fins 220.

The external longitudinal fins 220 may be made of steel (e.g. low carbon steel), or other suitable metallic materials including alloys which are each welded on one of the longitudinally-extending sides to the exterior of the containment vessel shell 204. The opposing longitudinally-extending side of each rib 220 lies proximate to, but is preferably not permanently affixed to the interior of the inner shell 310 of the containment enclosure structure (CES) 300 to maximize the heat transfer surface of the ribs acting as heat dissipation fins. In one embodiment, the external longitudinal fins 220 extend (substantially) radially outwards beyond the larger diameter top portion 216 of the containment vessel 200 as shown. In one representative example, without limitation, steel ribs 220 may have a thickness of about 1 inch. Other suitable thickness of ribs may be used as appropriate. Accordingly, in some embodiments, the ribs 220 have a radial width that is more than 10 times the thickness of the ribs.

Figure 2:
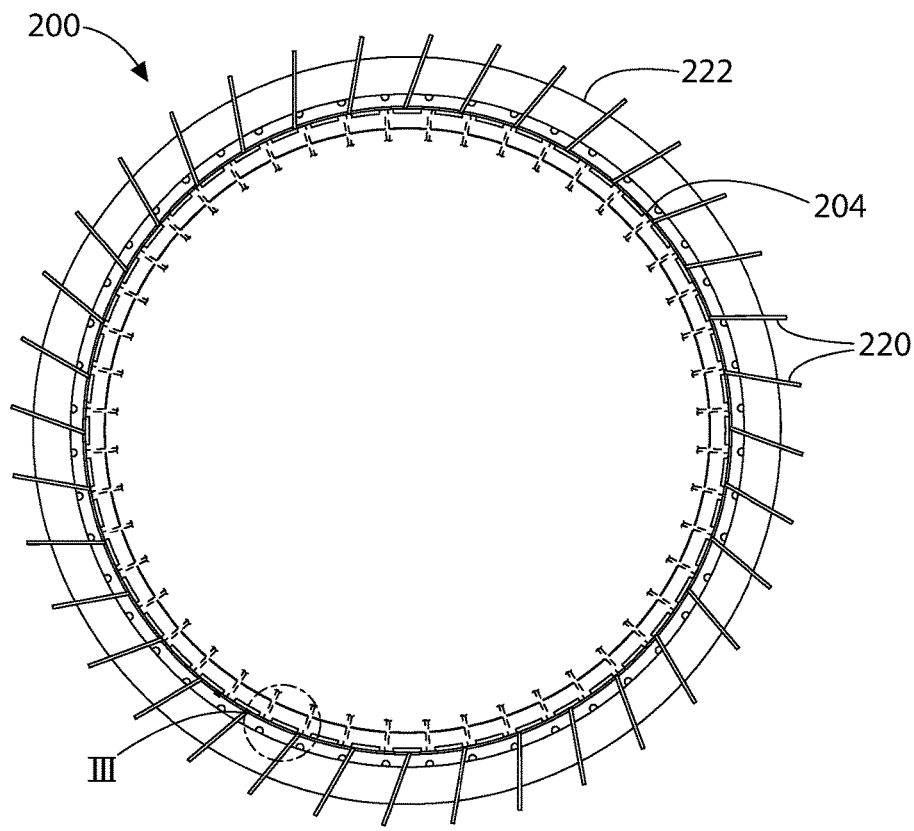
FIG. 2 is transverse cross-sectional view thereof taken along line II-II.
Figure 3:
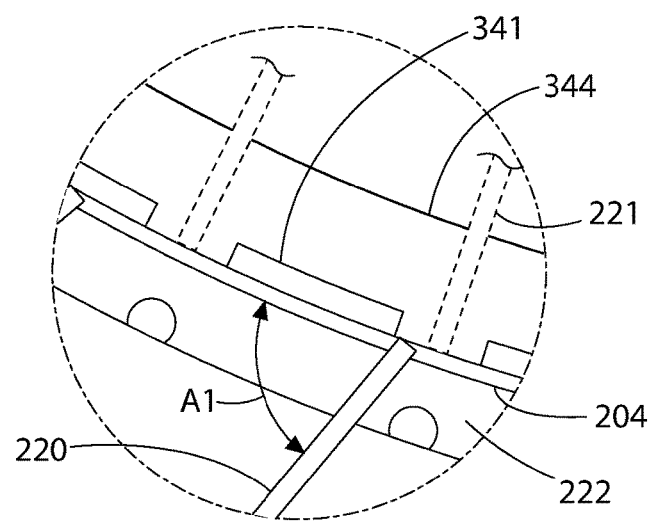
FIG. 3 is a detail of item III in FIG. 2.
Figure 5:
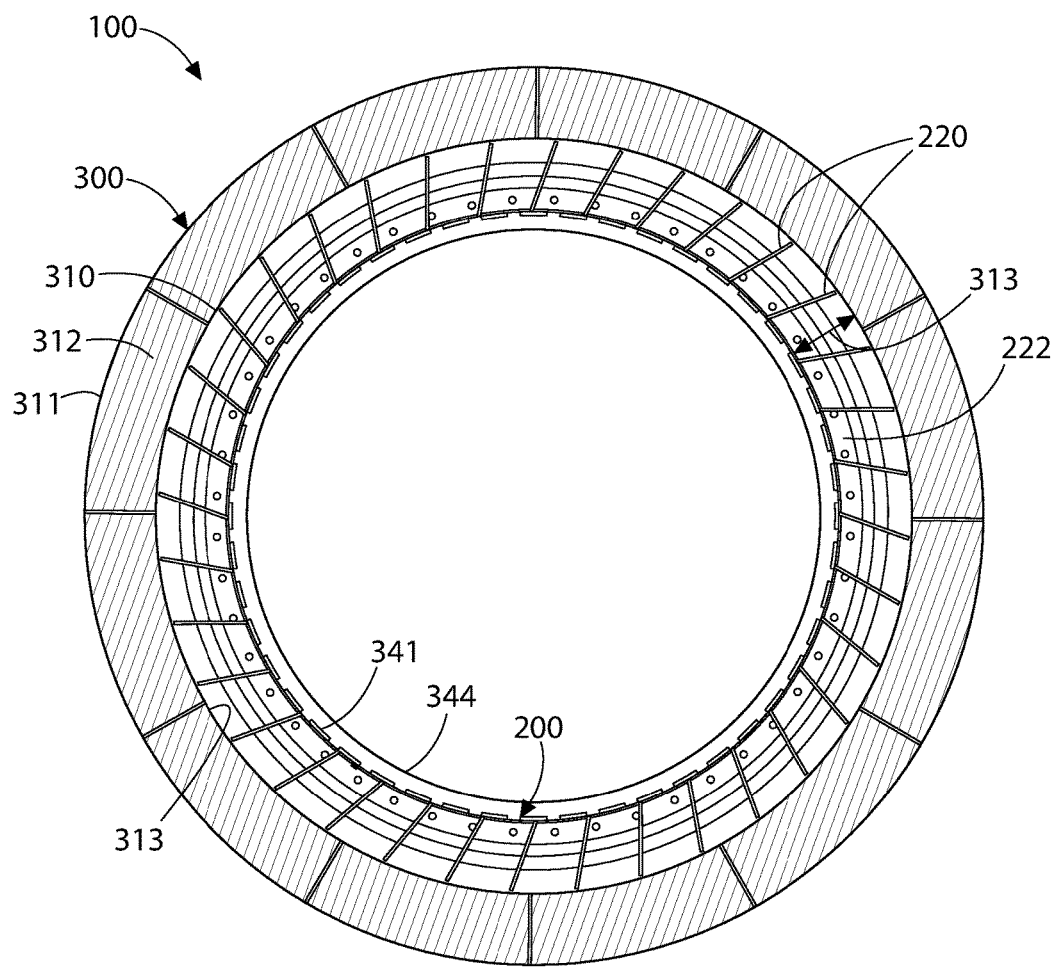
FIG. 5 is a longitudinal cross-sectional view through the containment vessel and containment enclosure structure (CES)

In one embodiment, the longitudinal fins 220 are oriented at an oblique angle A1 to containment vessel shell 204 as best shown in FIGS. 2-3 and 5. This orientation forms a crumple zone extending 360 degrees around the circumference of the containment vessel 200 to better resist projectile impacts functioning in cooperation with the outer containment enclosure structure (CES) 300. Accordingly, an impact causing inward deformation of the containment enclosure structure (CES) shells 210, 211 will bend the longitudinal fins 220 which in the process will distribute the impact forces preferably without direct transfer to and rupturing of the inner containment vessel shell 204 as might possibly occur with ribs oriented 90 degrees to the containment vessel shell 204. In other possible embodiments, depending on the construction of the containment enclosure structure (CES) 300 and other factors, a perpendicular arrangement of ribs 220 to the containment vessel shell 204 may be appropriate.

In one embodiment, referring to FIGS. 6-8, portions of the containment vessel shell 204 having and protected by the external (substantially) radial fins 220 against projectile impacts may extend below grade to provide protection against projectile strikes at or slightly below grade on the containment enclosure structure (CES) 300. Accordingly, the base mat 304 formed at the top of the vertically extending sidewalls 303 of the foundation 301 where the fins 220 terminate at their lower ends may be positioned a number of feet below grade to improve impact resistance of the nuclear reactor containment system.

In one embodiment, the containment vessel 200 may optionally include a plurality of circumferentially spaced apart internal (substantially) radial fins 221 attached to the interior surface of the shell 204 (shown as dashed in FIGS. 2 and 3). Internal fins 221 extend (substantially) radially inwards from containment vessel shell 204 and longitudinally in a vertical direction of a suitable height. In one embodiment, the internal (substantially) radial fins 221 may have a height substantially coextensive with the height of the water-filled annulus 313 and extend from the base mat 304 to approximately the top of the shell 204. In one embodiment, without limitation, the internal fins 221 may be oriented substantially perpendicular (i.e. 90 degrees) to the containment vessel shell 204. Other suitable angles and oblique orientations may be used. The internal fins function to both increase the available heat transfer surface area and structurally reinforce the containment vessel shell against external impact (e.g. projectiles) or internal pressure increase within the containment vessel 200 in the event of a containment pressurization event (e.g. LOCA or reactor scram). In one embodiment, without limitation, the internal fins 221 may be made of steel.

Referring to FIGS. 1-15, a plurality of vertical structural support columns 331 may be attached to the exterior surface of the containment vessel shell 204 to help support the diametrically larger top portion 216 of containment vessel 200 which has peripheral sides that are cantilevered (substantially) radially outwards beyond the shell 204. The support columns 331 are spaced circumferentially apart around the perimeter of containment vessel shell 204. In one embodiment, the support columns 331 may be formed of steel hollow structural members, for example without limitation C-shaped members in cross-section (i.e. structural channels), which are welded to the exterior surface of containment vessel shell 204. The two parallel legs of the channels may be vertically welded to the containment vessel shell 204 along the height of each support column 331 using either continuous or intermittent welds such as stitch welds.

The support columns 331 extend vertically downwards from and may be welded at their top ends to the bottom/underside of the larger diameter top portion 216 of containment vessel housing the polar crane. The bottom ends of the support columns 331 rest on or are welded to the circumferential rib 222 which engages the base mat 304 of the concrete foundation 301 near the buried portion of the containment. The columns 331 help transfer part of the dead load or weight from the crane and the top portion 216 of the containment vessel 300 down to the foundation. In one embodiment, the hollow space inside the support columns may be filled with concrete (with or without rebar) to help stiffen and further support the dead load or weight. In other possible embodiments, other structural steel shapes including filled or unfilled box beams, I-beams, tubular, angles, etc. may be used. The longitudinal fins 220 may extend farther outwards in a (substantially) radial direction than the support columns 331 which serve a structural role rather than a heat transfer role as the ribs 220. In certain embodiments, the ribs 220 have a (substantially) radial width that is at least twice the (substantially) radial width of support columns.

FIGS. 11-15 show various cross sections (both longitudinal and transverse) of containment vessel 200 with equipment shown therein. In one embodiment, the containment vessel 200 may be part of a small modular reactor (SMR) system such as SMR-160 by Holtec International. The equipment may generally include a nuclear reactor vessel 500 disposed in a wet well 504 and defining an interior space housing a nuclear fuel core inside and circulating primary coolant, and a steam generator 502 fluidly coupled to the reactor and circulating a secondary coolant which may form part of a Rankine power generation cycle. Such a system is described for example in PCT International Patent Application No. PCT/US13/66777 filed Oct. 25, 2013, which is incorporated herein by reference in its entirety. Other appurtenances and equipment may be provided to create a complete steam generation system.

Steam generator 502 is more fully described in International PCT Application No. PCT/US13/38289 filed Apr. 25, 2013, which is incorporated herein by reference in its entirety. As described therein and shown in FIGS. 11, 12, and 23 of the present application, the steam generator 502 may be vertically oriented and axially elongated similarly to submerged bundle heat exchanger 620. The steam generator 502 may be comprised of a set of tubular heat exchangers arranged in a vertical stack configured to extract the reactor's decay heat from the primary coolant by gravity-driven passive flow means.

Figure 23:
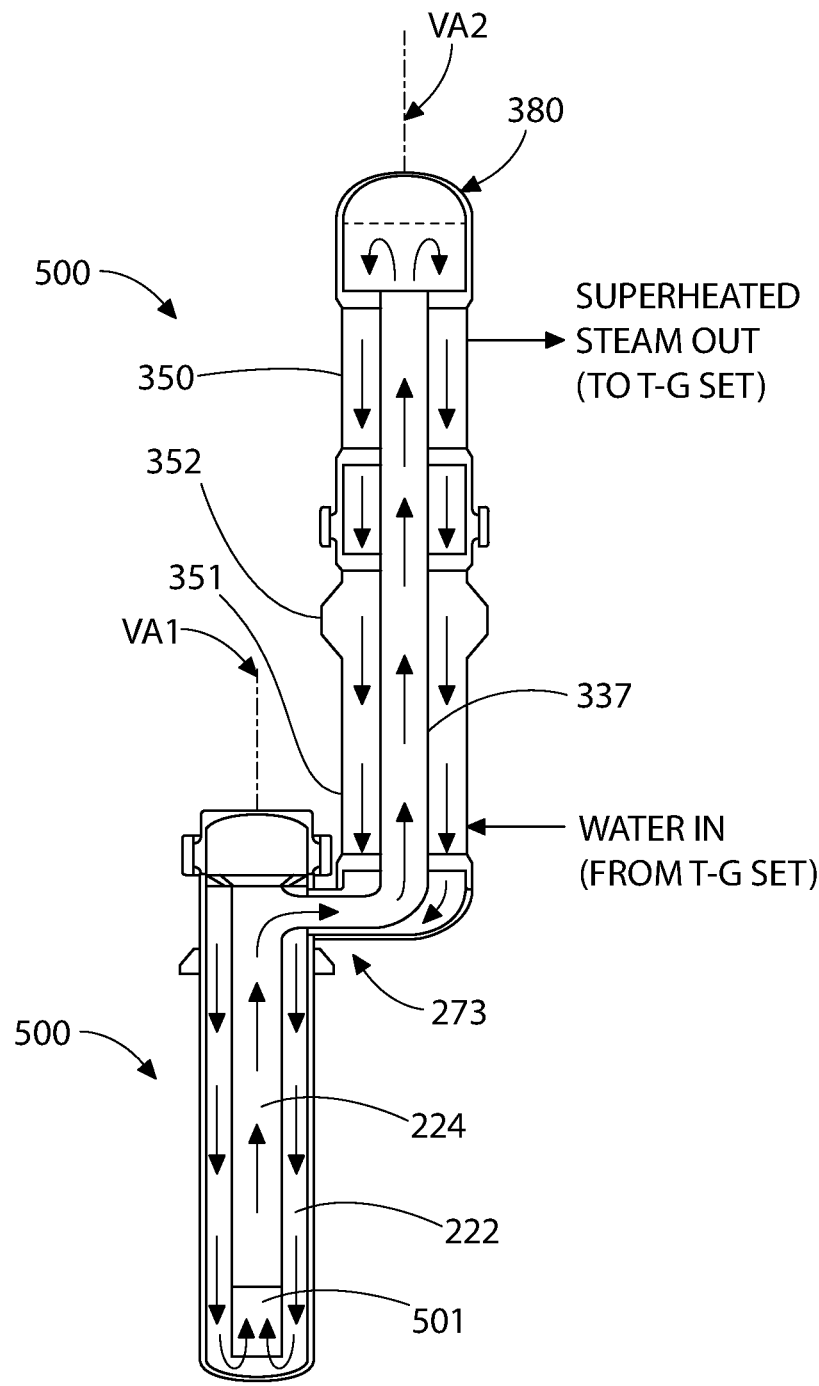
FIG. 23 is a schematic diagram showing the flow of primary and secondary coolant through the reactor vessel and steam generator.

The circulation flow loops of primary coolant (liquid water) and secondary coolant (liquid feedwater and steam) through the reactor vessel and steam generator during normal operation of the reactor and power plant with an available electric supply produced by the station turbine-generator (T-G) set is shown in FIG. 23 herein. The primary coolant flow between the fluidly coupled steam generator 502 and reactor vessel 500 forms a first closed flow loop for purposes of the present discussion. In one embodiment, the primary coolant flow is gravity-driven relying on the change in temperature and corresponding density of the coolant as it is heated in the reactor vessel 500 by nuclear fuel core 501, and then cooled in the steam generator 502 as heat is transferred to the secondary coolant loop of the Rankine cycle which drives the turbine-generator set. The pressure head created by the changing different densities of the primary coolant (i.e. hot—lower density and cold—higher density) induces flow or circulation through the reactor vessel-steam generating vessel system as shown by the directional flow arrows.

In general with respect to a pressurized closed flow loop, the primary coolant is heated by the nuclear fuel core 501 and flows upwards in riser column 224. The primary coolant from the reactor vessel 500 then flows through the primary coolant fluid coupling 273 between the reactor vessel 500 and steam generator 502 and enters the steam generator. The primary coolant flows upward in the centrally located riser pipe 337 to a pressurizer 380 at the top of the steam generator. The primary coolant reverses direction and flows down through the tube side of the steam generator 502 and returns to the reactor vessel 500 through the fluid coupling 273 where it enters an annular downcomer 222 to complete the primary coolant flow loop.

Figure 11:
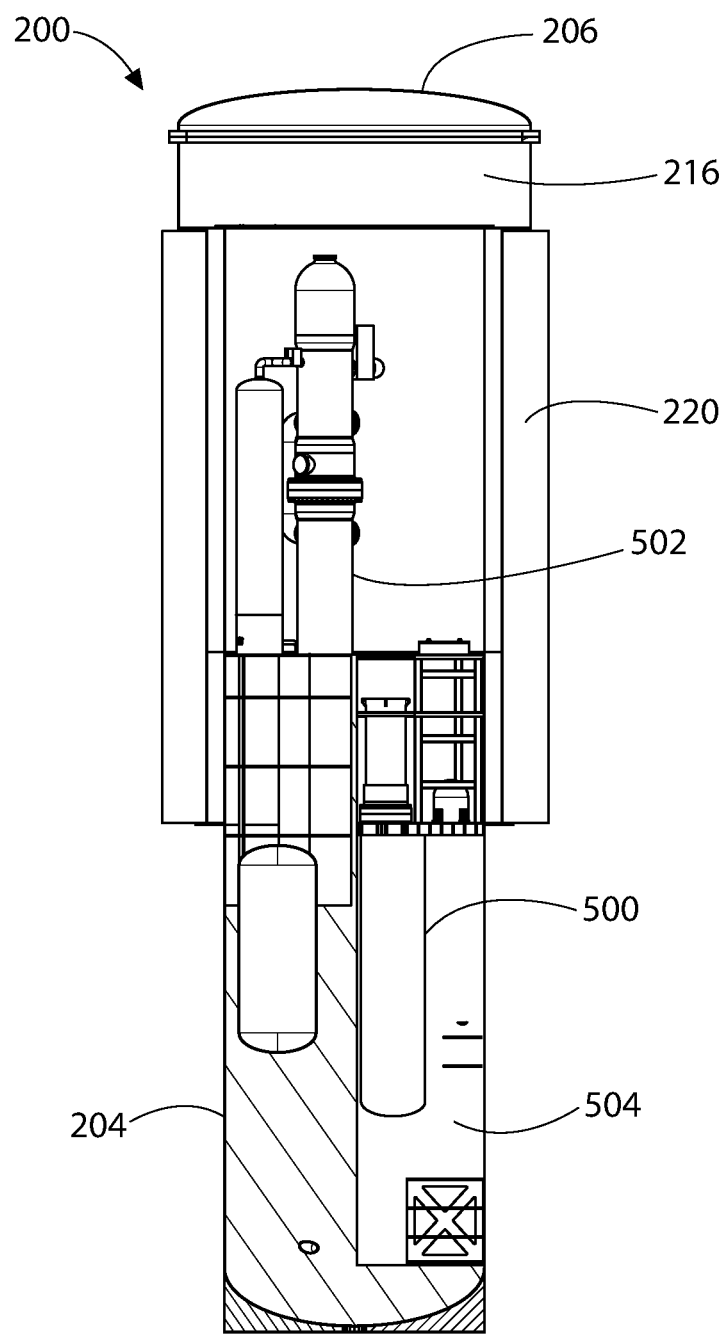
FIG. 11 is a longitudinal cross-sectional view thereof taken along line XI-XI in FIG. 10.
Figure 12:
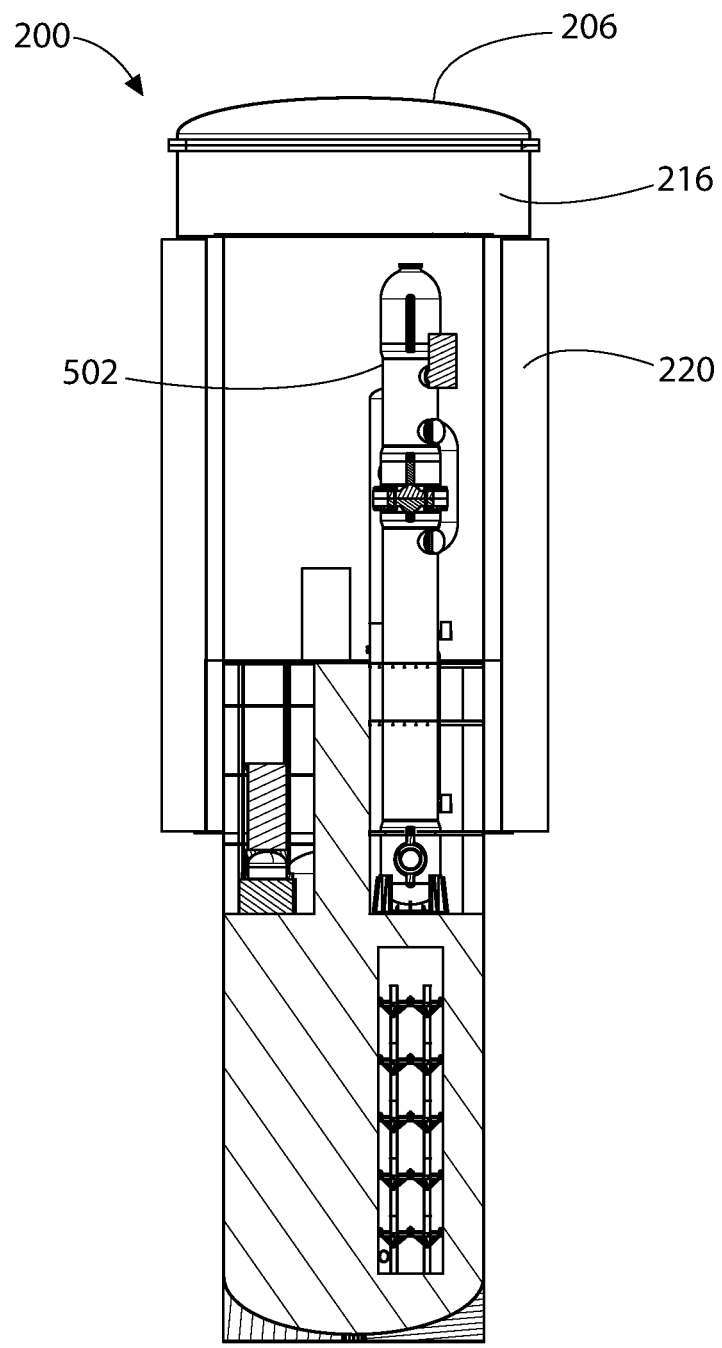
FIG. 12 is a longitudinal cross-sectional view thereof taken along line XII-XII in FIG. 10.
Figure 13:
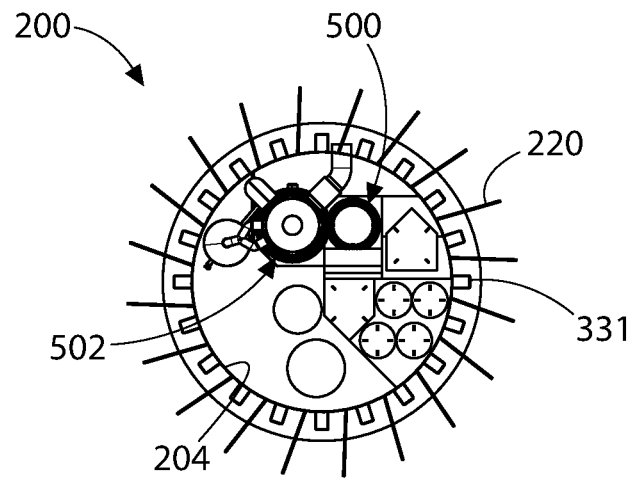
FIG. 13 is a transverse cross-sectional view thereof taken along line XIII-XIII in FIG. 9.
Figure 14:
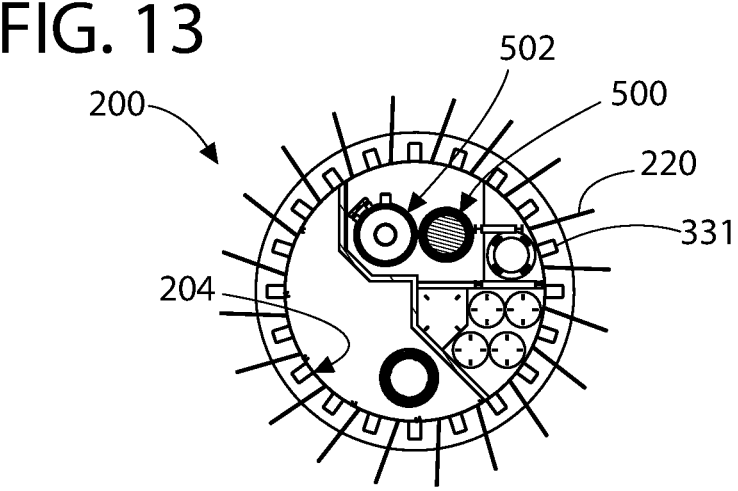
FIG. 14 is a transverse cross-sectional view thereof taken along line XIV-XIV in FIG. 9.
Figure 15:
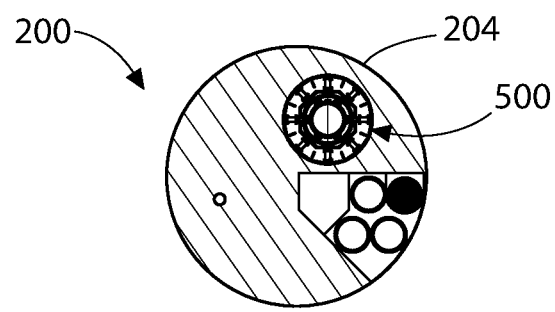
FIG. 15 is a transverse cross-sectional view thereof taken along line XV-XV in FIG. 9.

The steam generator 502 may include three vertically stacked heat transfer sections—from bottom up a preheater section 351, steam generator section 352, and superheater section 350 (see, e.g. FIGS. 11, 12, and 23). Secondary coolant flows on the shellside of the steam generator 502 vessel. Secondary coolant in the form of liquid feedwater from the turbine-generator (T-G) set of the Rankine cycle enters the steam generator at the bottom in the preheater section 351 and flows upwards through the steam generator section 352 being converted to steam. The steam flows upwards into the superheater section 350 and reaches superheat conditions. From there, the superheated steam is extracted and flows to the T-G set to produce electric power.

Auxiliary Heat Dissipation System

Referring primarily now to FIGS. 2-3, 16, and 18, the containment vessel 200 may further include an auxiliary heat dissipation system 340 comprising a discrete set or array of heat dissipater ducts 341 (HDD). In one embodiment, the auxiliary heat dissipation system 340 and associated heat dissipater ducts 341 may form part of a passive reactor core cooling system described in further detail below and shown in FIGS. 22 and 23.

Heat dissipater ducts 341 include a plurality of internal longitudinal ducts (i.e. flow conduits) circumferentially spaced around the circumference of containment vessel shell 204. Ducts 341 extend vertically parallel to the vertical axis VA and in one embodiment are attached to the interior surface of shell 204. The ducts 341 may be made of metal such as steel and are welded to interior of the shell 204. In one possible configuration, without limitation, the ducts 341 may be comprised of vertically oriented C-shaped structural channels (in cross section) or half-sections of pipe/tube positioned so that the parallel legs of the channels or pipe/tubes are each seam welded to the shell 204 for their entire height to define a sealed vertical flow conduit. The fluid (liquid or steam phase) in the heat dissipater ducts in this embodiment therefore directly contacts the reactor containment vessel 200 to maximize heat transfer through the vessel to the water in the annular reservoir (primary annulus 313) which forms a heat sink for the reactor containment vessel 200 and the heat dissipater ducts. Other suitably shaped and configured heat dissipater ducts 341 may be provided for this type construction so long as the fluid conveyed in the ducts contacts at least a portion of the interior containment vessel shell 204 to transfer heat to the water-filled annulus 313.

In other possible but less preferred acceptable embodiments, the heat dissipater ducts 341 may be formed from completely tubular walled flow conduits (e.g. full circumferential tube or pipe sections rather than half sections) which are welded to the interior containment vessel shell 204. In these type constructions, the fluid conveyed in the ducts 341 will transfer heat indirectly to the reactor containment vessel shell 204 through the wall of the ducts first, and then to the water-filled annulus 313.

Any suitable number and arrangement of ducts 341 may be provided depending on the heat transfer surface area required for cooling the fluid flowing through the ducts. The ducts 341 may be uniformly or non-uniformly spaced on the interior of the containment vessel shell 204, and in some embodiments grouped clusters of ducts may be circumferentially distributed around the containment vessel. The ducts 341 may have any suitable cross-sectional dimensions depending on the flow rate of fluid carried by the ducts and heat transfer considerations.

The open upper and lower ends 341a, 341b of the ducts 341 are each fluidly connected to a common upper inlet ring header 343 and lower outlet ring header 344. The annular shaped ring headers 343, 344 are vertically spaced apart and positioned at suitable elevations on the interior of the containment vessel 200 to maximize the transfer of heat between fluid flowing vertically inside ducts 341 and the shell 204 of the containment vessel in the active heat transfer zone defined by portions of the containment vessel having the external longitudinal fins 220 in the primary annulus 313. To take advantage of the primary water-filled annulus 313 for heat transfer, upper and lower ring headers 343, 344 may each respectively be located on the interior of the containment vessel shell 204 adjacent and near to the top and bottom of the annulus.

In one embodiment, the ring headers 343, 344 may each be formed of half-sections of arcuately curved steel pipe as shown which are welded directly to the interior surface of containment vessel shell 204 in the manner shown. In other embodiments, the ring headers 343, 344 may be formed of complete sections of arcuately curved piping supported by and attached to the interior of the shell 204 by any suitable means.

In one embodiment, the heat dissipation system 340 is fluidly connected to a source of steam that may be generated from a water mass inside the containment vessel 200 to reject radioactive material decay heat from the reactor core. The containment surface enclosed by the ducts 341 serves as the heat transfer surface to transmit the latent heat of the steam inside the ducts to the shell 204 of the containment vessel 200 for cooling via the external longitudinal fins 220 and water filled annulus 313. In operation, steam enters the inlet ring header 343 and is distributed to the open inlet ends of the ducts 341 penetrating the header. The steam enters the ducts 341 and flows downwards therein along the height of the containment vessel shell 204 interior and undergoes a phase change from steam to liquid. The condensed steam drains down by gravity in the ducts and is collected by the lower ring header 344 from which it is returned back to the source of steam also preferably by gravity in one embodiment. It should be noted that no pumps are involved or required in the foregoing process.

It will be appreciated that in certain embodiments, more than one set or array of heat dissipater ducts 341 may be provided and arranged on the inside surface of the inner containment vessel 200 within the containment space defined by the vessel.

Auxiliary Air Cooling System

According to another aspect of the present disclosure, a secondary or backup passive air cooling system 400 is provided to initiate air cooling by natural convection of the containment vessel 200 if, for some reason, the water inventory in the primary annulus 313 were to be depleted during a thermal reactor related event (e.g. LOCA or reactor scram). Referring to FIG. 8, the air cooling system 400 may be comprised of a plurality of vertical inlet air conduits 401 spaced circumferentially around the containment vessel 200 in the primary annulus 313. Each air conduit 401 includes an inlet 402 which penetrates the sidewalls 320 of the containment enclosure structure (CES) 300 and is open to the atmosphere outside to draw in ambient cooling air. Inlets 402 are preferably positioned near the upper end of the containment enclosure structure's sidewalls 320. The air conduits 401 extend vertically downwards inside the annulus 313 and terminate a short distance above the base mat 304 of the foundation (e.g. approximately 1 foot) to allow air to escape from the open bottom ends of the conduits.

Using the air conduits 401, a natural convection cooling airflow pathway is established in cooperation with the annulus 313. In the event the cooling water inventory in the primary annulus 313 is depleted by evaporation during a thermal event, air cooling automatically initiates by natural convection as the air inside the annulus will continue to be heated by the containment vessel 200. The heated air rises in the primary annulus 313, passes through the secondary annulus 330, enters the head space 318, and exits the dome 316 of the containment enclosure structure (CES) 300 through the vent 317 (see directional flow arrows, FIG. 8). The rising heated air creates a reduction in air pressure towards the bottom of the primary annulus 313 sufficient to draw in outside ambient downwards through the air conduits 401 thereby creating a natural air circulation pattern which continues to cool the heated containment vessel 200. Advantageously, this passive air cooling system and circulation may continue for an indefinite period of time to cool the containment vessel 200.

It should be noted that the primary annulus 313 acts as the ultimate heat sink for the heat generated inside the containment vessel 200. The water in this annular reservoir also acts to maintain the temperature of all crane vertical support columns 331 (described earlier) at essentially the same temperature thus ensuring the levelness of the crane rails (not shown) at all times which are mounted in the larger portion 216 of the containment vessel 200.

Figure 19:
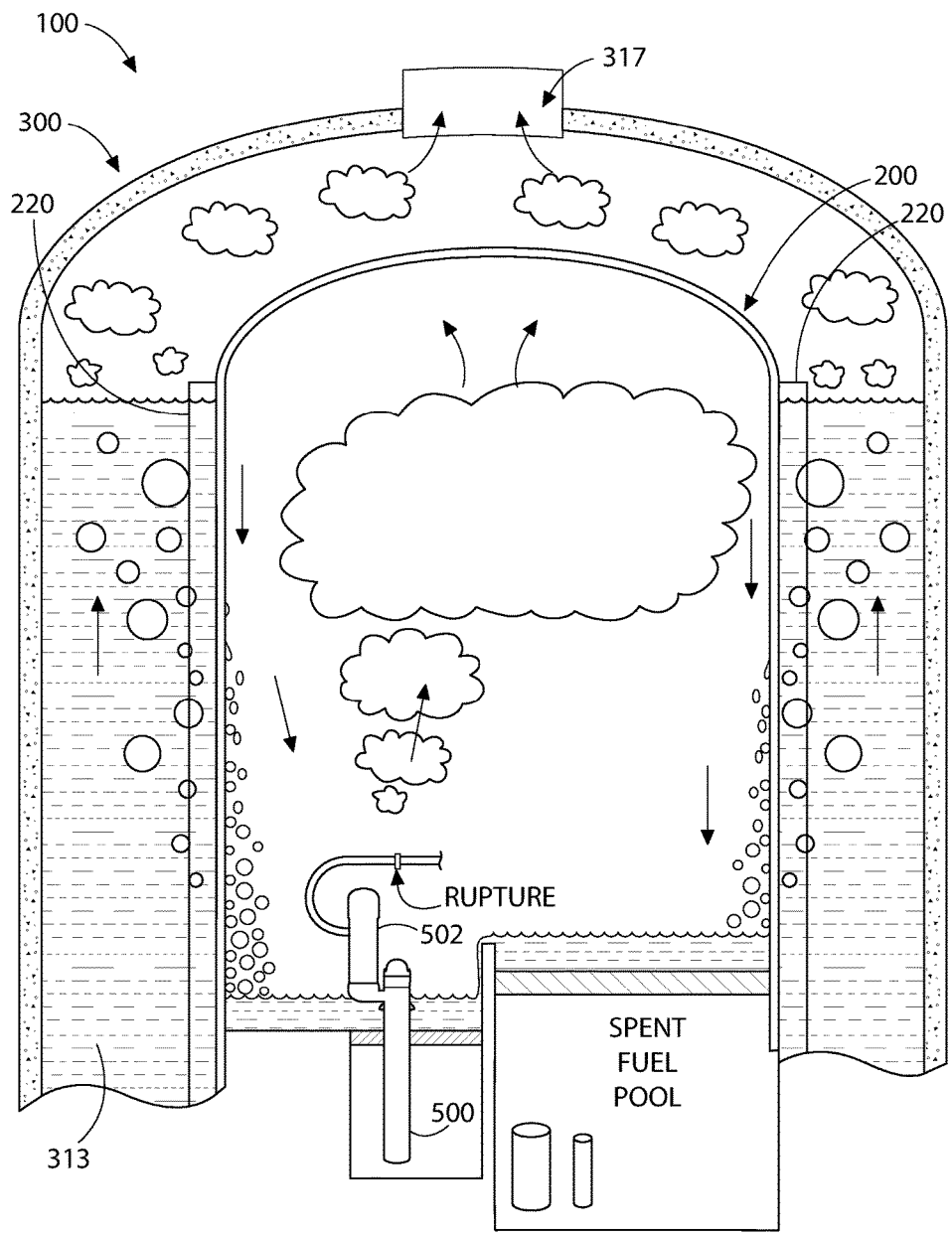
FIG. 19 is a schematic depiction of a generalized cross-section of the nuclear reactor containment system and operation of the water filled annular reservoir to dissipate heat and cool the containment vessel during a thermal energy release event.

Operation of the reactor containment system 100 as a heat exchanger will now be briefly described with initial reference to FIG. 19. This figure is a simplified diagrammatic representation of the reactor containment system 100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 200. The liquid flashes instantaneously into steam and the vapor mixes with the air inside the containment and migrates to the inside surface of the containment vessel 200 sidewalls or shell 204 (since the shell of the containment is cooler due the water in the annulus 313). The vapor then condenses on the vertical shell walls by losing its latent heat to the containment structure metal which in turn rejects the heat to the water in the annulus 313 through the longitudinal fins 220 and exposed portions of the shell 204 inside the annulus. The water in the annulus 313 heats up and eventually evaporates forming a vapor which rises in the annulus and leaves the containment enclosure structure (CES) 300 through the secondary annulus 330, head space 318, and finally the vent 317 to atmosphere.

As the water reservoir in annulus 313 is located outside the containment vessel environment, in some embodiments the water inventory may be easily replenished using external means if available to compensate for the evaporative loss of water. However, if no replenishment water is provided or available, then the height of the water column in the annulus 313 will begin to drop. As the water level in the annulus 313 drops, the containment vessel 200 also starts to heat the air in the annulus above the water level, thereby rejecting a portion of the heat to the air which rises and is vented from the containment enclosure structure (CES) 300 through vent 317 with the water vapor. When the water level drops sufficiently such that the open bottom ends of the air conduits 401 (see, e.g. FIG. 8) become exposed above the water line, fresh outside ambient air will then be pulled in from the air conduits 401 as described above to initiate a natural convection air circulation pattern that continues cooling the containment vessel 200.

In one embodiment, provisions (e.g. water inlet line) are provided through the containment enclosure structure (CES)

300 for water replenishment in the annulus 313 although this is not required to insure adequate heat dissipation. The mass of water inventory in this annular reservoir is sized such that the decay heat produced in the containment vessel 200 has declined sufficiently such that the containment is capable of rejecting all its heat through air cooling alone once the water inventory is depleted. The containment vessel 200 preferably has sufficient heat rejection capability to limit the pressure and temperature of the vapor mix inside the containment vessel (within its design limits) by rejecting the thermal energy rapidly.

Figure 16:
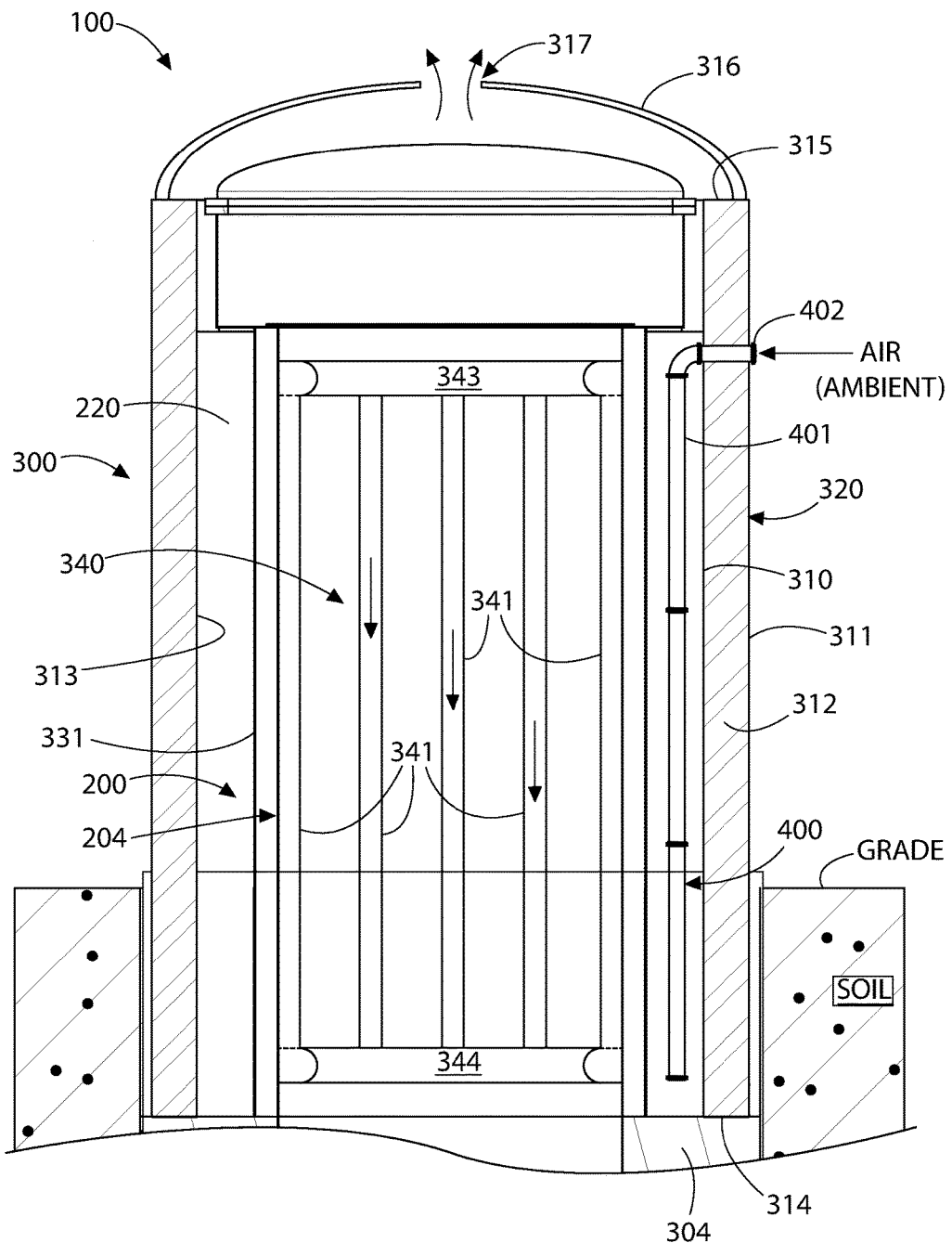
FIG. 16 is a partial longitudinal cross-sectional view of the nuclear reactor containment system showing an auxiliary heat dissipation system.
Figure 17:
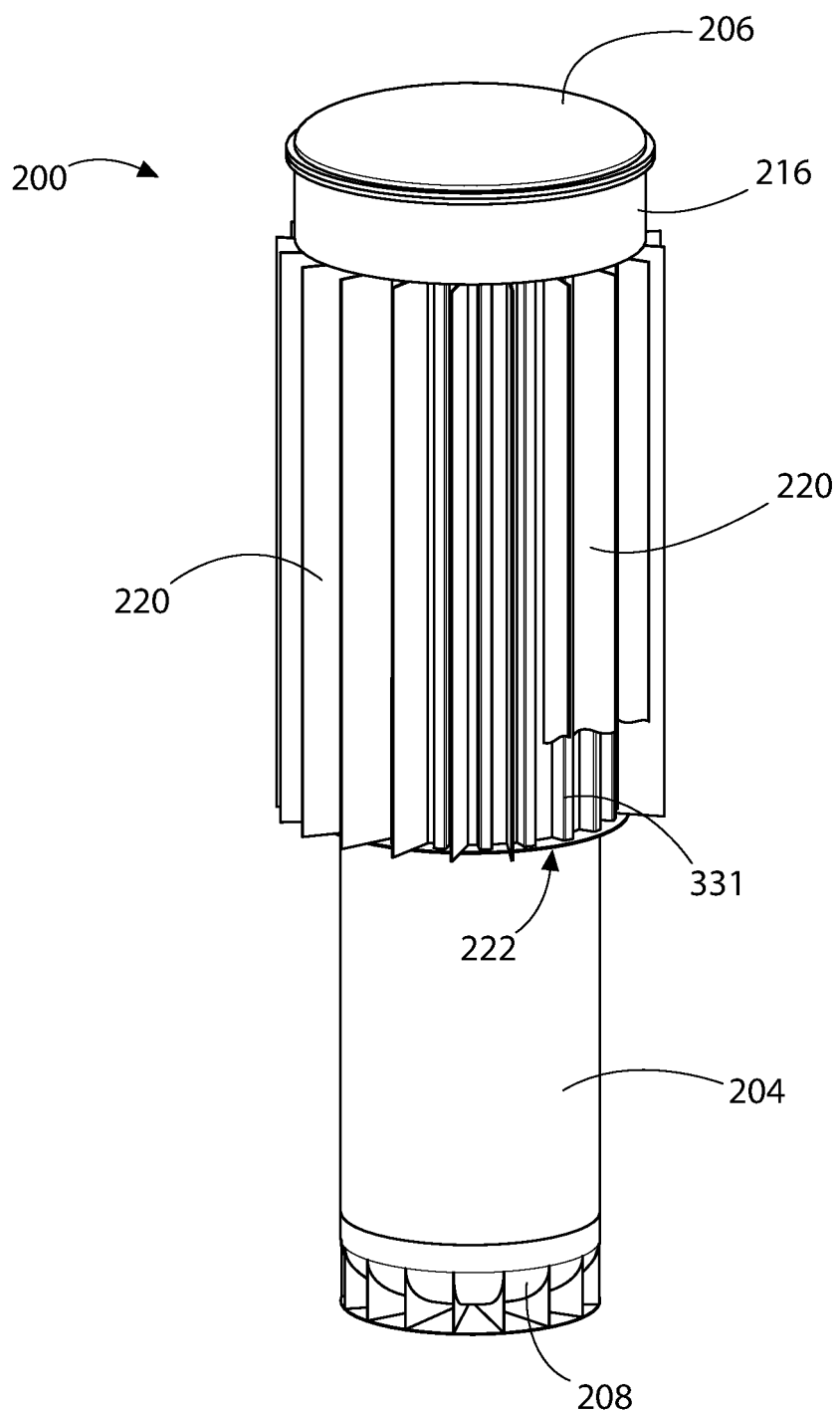
FIG. 17 is an isometric view of the containment vessel with lower portions of the (substantially) radial fins of the containment vessel broken away in part to reveal vertical support columns and circumferential rib.
Figure 18:
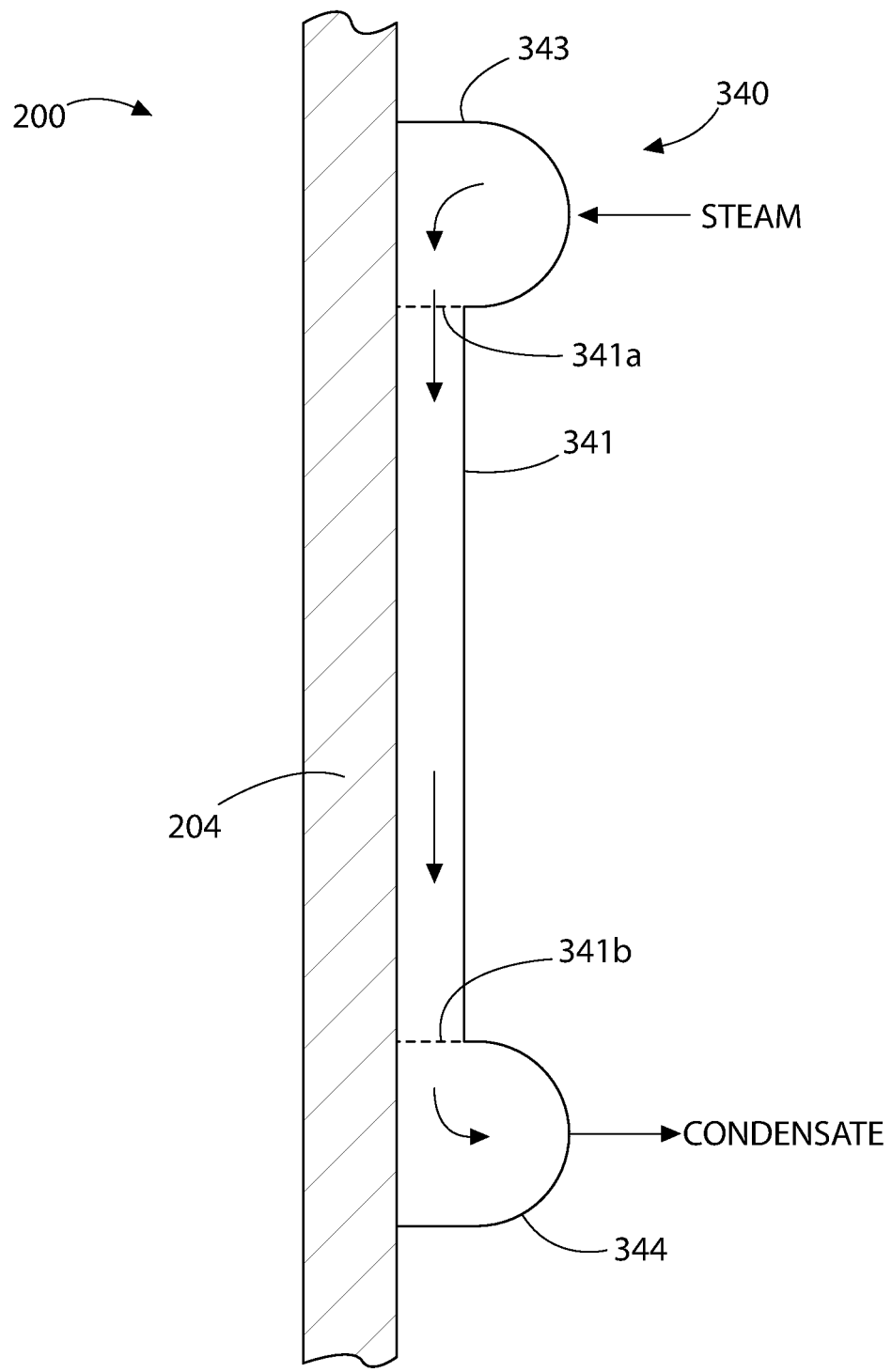
FIG. 18 is a longitudinal cross-sectional view of a portion of the heat dissipation system of FIG. 16 showing upper and lower ring headers and ducts attached to the shell of the containment vessel.

In the event of a station blackout, the reactor core is forced into a "scram" and the passive core cooling systems will reject the decay heat of the core in the form of steam directed to upper inlet ring header 343 of heat dissipation system 340 already described herein (see, e.g. FIGS. 16 and 18). The steam then flowing downwards through the network of internal longitudinal ducts 341 comes in contact with the containment vessel shell 204 interior surface enclosed within the heat dissipation ducts and condenses by rejecting its latent heat to the containment structure metal, which in turn rejects the heat to the water in the annulus via heat transfer assistance provide by the longitudinal fins 220. The water in the annular reservoir (primary annulus 313) heats up eventually evaporating. The containment vessel 200 rejects the heat to the annulus by sensible heating and then by a combination of evaporation and air cooling, and then further eventually by natural convection air cooling only as described herein. As mentioned above, the reactor containment system 100 is designed and configured so that air cooling alone is sufficient to reject the decay heat once the effective water inventory in annulus 313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Passive Reactor Cooling System

According to another aspect of the invention, a passive gravity-driven nuclear reactor cooling system 600 is provided to reject the reactor's decay heat following a loss-of-coolant accident (LOCA) during which time the reactor is shutdown (e.g. "scram"). The cooling system does not rely on and suffer the drawbacks of pumps and motors which require an available electric supply. Accordingly, the reactor cooling system 600 can advantageously operate during a power plant blackout situation.

Figure 20:
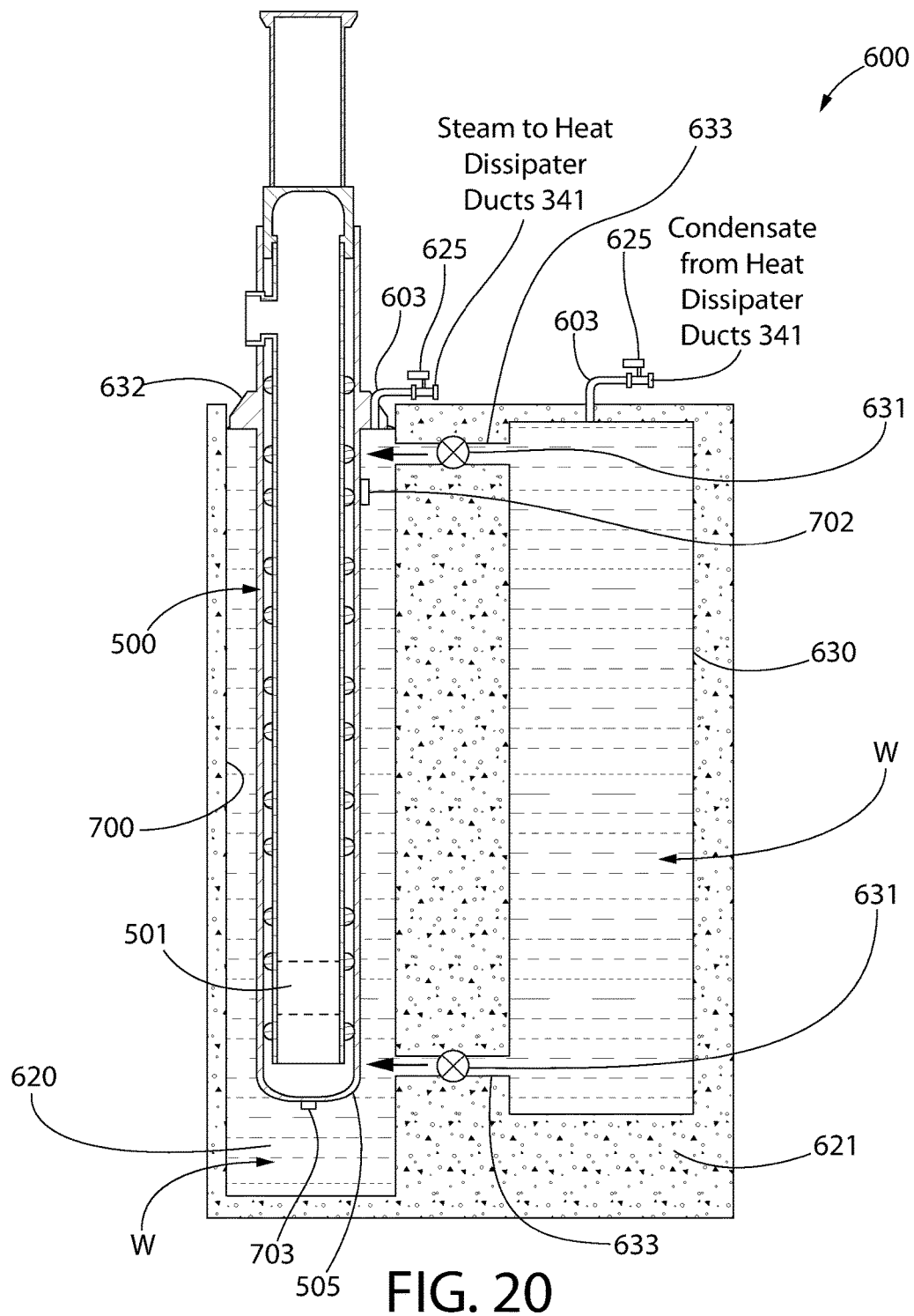
FIG. 20 is schematic diagram showing a reactor vessel and related portion of a reactor cooling system according to the present disclosure for cooling a reactor core in the event of a LOCA.
Figure 21:
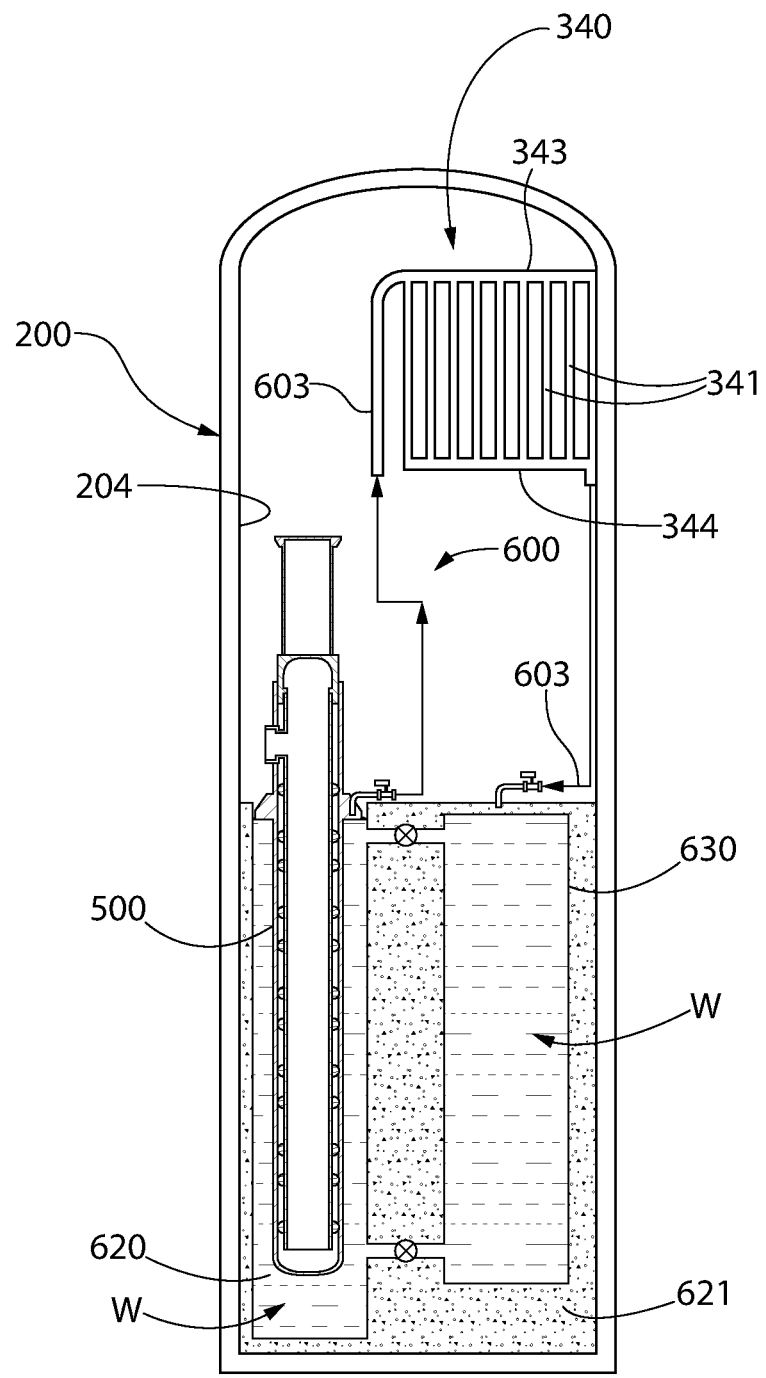
FIG. 21 is a schematic diagram showing the overall reactor cooling system and containment structure for cooling a reactor core.

Referring to FIGS. 20 and 21, the passive reactor cooling system 600 in one embodiment is an atmospheric pressure closed loop flow system in one embodiment comprised of three major fluidly coupled parts or sub-systems, namely (i) a reactor well 620, (ii) a discrete set or array of heat dissipater ducts 341 (HDD) integrally connected to the inner wall of the containment structure (described in detail above), and (iii) an in-containment reactor water storage tank 630 filled with a reserve of cooling water. The reactor cooling system 600 is configured to utilize cooling water flooded into the reactor well 620 from the storage tank to extract the thermal energy generated by the fuel core during a reactor shutdown and LOCA that can continue indefinitely in the absence of an available source of electric power, as further described herein. Although FIGS. 20 and 21 shows the reactor well 620 in the flooded condition, it should be noted that the reactor well is dry and empty during the normal power generation operating mode of the reactor prior to a LOCA event.

Referring to FIGS. 20-23, the reactor vessel 500 containing the nuclear core 501 is disposed in reactor well 620 defined by a large concrete monolith 621. The monolith 621 is formed inside the inner containment vessel 200 (best shown in FIG. 21). Reactor vessel 500 is generally formed by a vertically elongated cylindrical shell (sidewall) and a closed bottom head 505. Accordingly, the reactor vessel 500 is vertically oriented with a majority of the height or length of the reactor vessel being positioned inside the reactor well as shown. The reactor well 620 is an annular vacant space surrounding the reactor vessel 500 and may be dry and unfilled during normal power generation operation of the reactor. The bottom head 505 of the reactor vessel 500 is spaced above the bottom of the reactor well 620. The top of the reactor well 620 may be partially or completely closed by a closure structure. In one embodiment, the closure structure may be formed at least in part by a ring-shaped reactor support flange 632 that extends circumferentially around the perimeter of the reactor vessel 500. The annular support flange may be supported by the concrete monolith 621. Additional structural and other elements (e.g. metal, concrete, seals/gaskets, etc.) may be provided to supplement the support flange 632 and to seal the top of the reactor well 630 if it is to be completely sealed for better capturing steam present in the reactor well which is directed to the auxiliary heat dissipation system 340, as further described herein.

Figure 22:
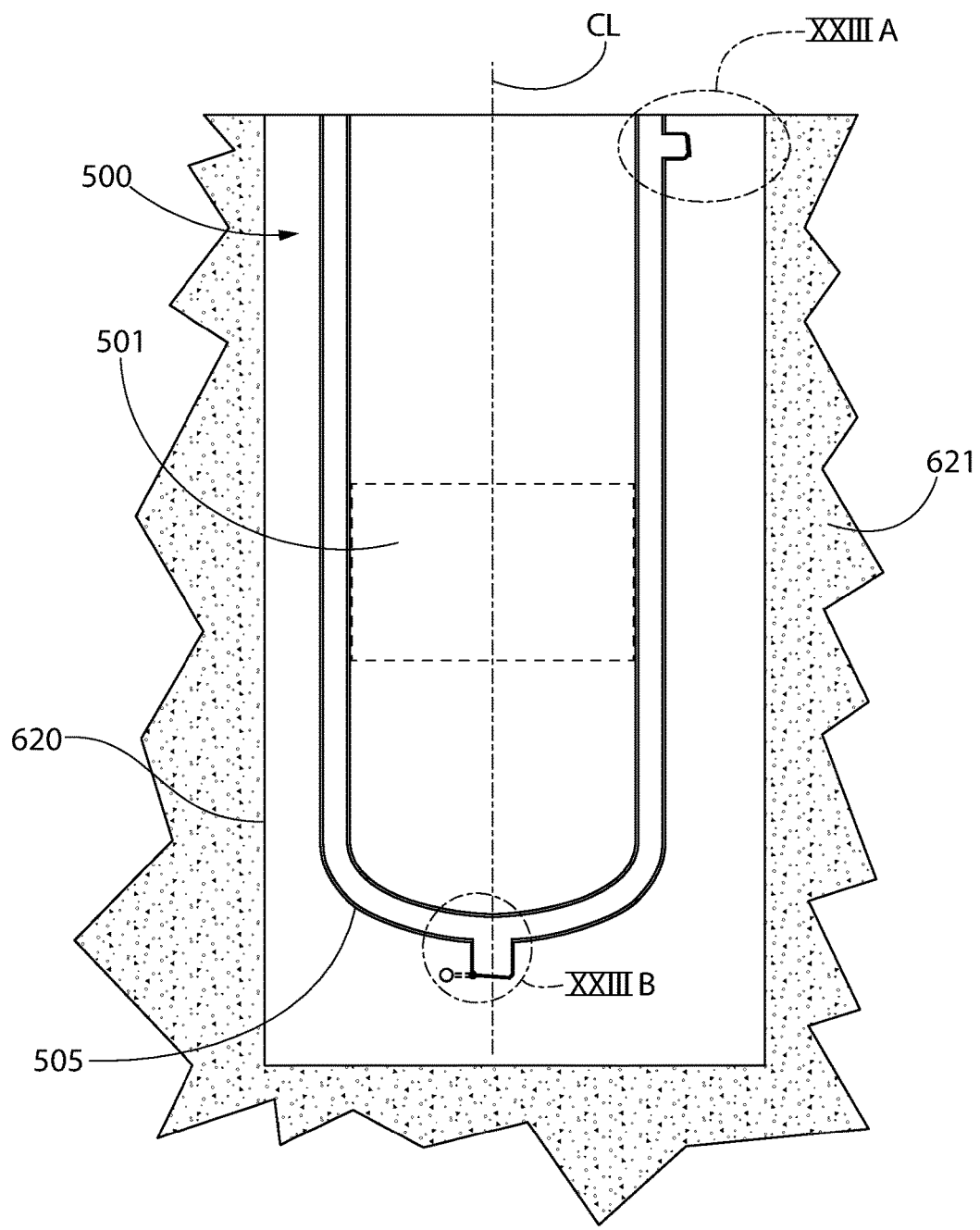
FIG. 22 is side cross sectional view showing the lower portion of the reactor well and reactor vessel with an insulating liner system and flow-hole nozzle arrangement.
Figure 22A:
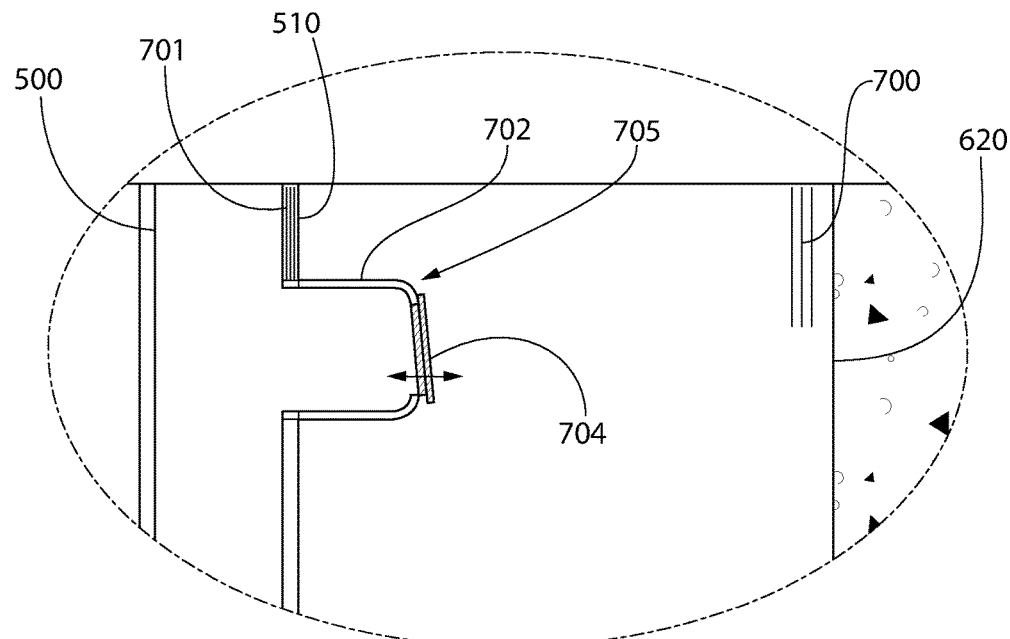
FIGS. 22A and 22B are details from FIG. 22 showing flow-hole nozzles.
Figure 22B:
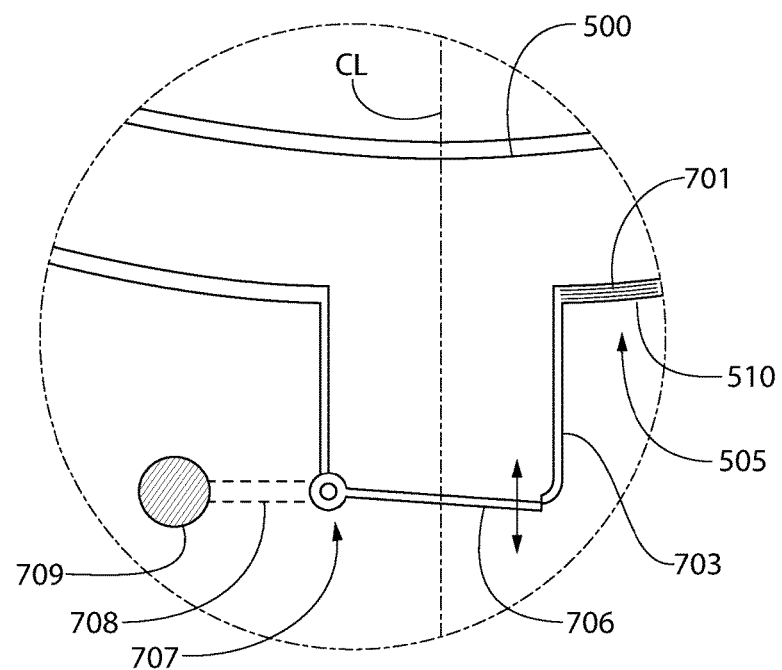

The outer wall of the reactor well 620 may be insulated by one or more layers of stainless steel liners 700 with small interstitial space or air gap formed between them (see, e.g. FIGS. 22, 22A, 22B). For additional cooling of the reactor well space, cold water may be circulated in the inter-liner spaces in some embodiments. The stainless steel liners 700 serve to block extensive heating of the concrete monolith 621 forming the reactor well.

Referring to FIGS. 20 and 22 (including sub-parts A and B), the outside surface of the reactor vessel 500 may also be insulated by a liner assembly comprised of one or more layers of metal liners 701 with small interstitial spaces or air gaps therebetween which serve to retard the outflow of heat generated by the reactor core 501 during normal reactor operation. In some non-limiting examples, the liners may preferably be stainless steel or aluminum; however, other suitable metals for a reactor well environment may be used. Preferably, in one embodiment, the liners 701 may extend completely around the circumference and the entire height of the reactor vessel 500 that is positioned within the reactor well 620 including under the bottom head 505 of the reactor vessel. The entire perimeter of the reactor vessel 500 lying within the reactor well may therefore include the liners 701 such that a plurality of liners is disposed between the outside surface of the reactor vessel 500 and outermost liner 510.

The insulating liner assembly comprised of liners 701 may include an array of one or more flow-holes which may be formed by top flow-hole nozzles 702 disposed in the upper sidewall (shell) region of the reactor vessel 500 and reactor well 620, preferably below the first pipe penetration into the reactor vessel in one embodiment. The nozzles 702 are in fluid communication with the air gaps (interstitial spaces) in the insulating liner assembly and space formed within the reactor well 620. The top flow-hole nozzles 702 are therefore disposed on the outside surface of the reactor vessel sidewall, but are not in fluid communication with the interior of the reactor vessel 500 and primary coolant therein. Although in some embodiments the nozzles 702 may be attached to outside surface of the reactor vessel for support, the nozzles are instead configured to be in fluid communication with the air gaps formed in the side liner 701 assembly on the outside of the reactor vessel as noted above. In one embodiment, for example, this may be accomplished by providing a plurality of lateral holes in the nozzles 702 adjacent the air gaps between the liners 701. The top flow-hole nozzles 702 are configured and operable to evacuate steam flowing within the liner assembly and discharge the steam to the reactor well, as further described herein.

The top flow-hole nozzles 702 may be circumferentially spaced around the reactor vessel. In one non-limiting embodiment, four top flow-hole nozzles 702 may be provided at approximately the same elevation. Other arrangements and numbers of top flow-hole nozzles 702 may be provided.

One or more bottom flow-hole nozzles 703 may also be provided for the vessel liners 701 adjacent the bottom head 505 of the reactor vessel 500. In one embodiment, a single larger nozzle 703 may be provided which is concentrically aligned with the centerline CL of the reactor vessel 500 at the lowest point on the arcuate bottom reactor vessel head 505. The nozzle 703 may be supported, configured, and arranged to form fluid communication with the air gaps (interstitial spaces) between the bottom liners 701 and reactor well 620 in similar fashion as the top flow-hole nozzles 702. Nozzle 703 may therefore be constructed and operate similarly to top flow-hole nozzles 702 being supported by, but not in fluid communication with the interior of the reactor vessel 500 and primary coolant therein. The bottom flow-hole nozzle 703 is configured and operable to admit cooling water in the reactor well from the water storage tank 630 into the lower portion of the insulating liner assembly, as further described herein.

The top flow-hole nozzles 702 may have provisions such as closure flaps 704 which are designed to remain closed during normal operation of the reactor when the gaps between the reactor vessel 500 and the liners 701 are filled with air (see, e.g. FIG. 22A). The flap and nozzle combination forms a flap valve. The flaps 704 are each pivotably movable and connected to its respective nozzle 702 at a top end by a pivot 705. Any suitable type of pivot may be provided, such as without limitation a pinned joint or self-hinge wherein the flap is made of a flexible material such as a high temperature withstanding polymer. The flaps 704 may be made of any suitable metallic or non-metallic material. The vertical orientation and weight of the flap 704 holds it in the closed position against the free end of nozzle 702 by gravity. In other embodiments, a commercially available flap valve comprising a valve body and flap may instead be mounted on the free end of the top flow-hole nozzles 702 to provide the same functionality.

The bottom flow-hole nozzles 703 are also normally each closed by a flap 706 during normal operation of the reactor when the gaps between the reactor vessel 500 and the liners 701 are filled with air (see, e.g. FIG. 22B). In one embodiment, the flaps 706 may be held closed via a float device including a buoyant float 709 rigidly connected to one end of the flap by a linkage arm 708. The flap 706 and linkage arm 708 assembly is pivotably coupled to a bottom nozzle 703 by a pivot 707, such as without limitation a pinned joint in one embodiment. Flap 706 is preferably made of a rigid metallic or non-metallic material in order to maintain its shape and seal against the free end of nozzle 703 when in its closed position.

In operation, gravity acts downward on the float 709 when the reactor well 620 is empty during normal operation of the reactor. This rotates the float 709 and the flap 706 assembly in a counter-clockwise direction to force the flap against the free end of nozzle 703. When water floods the reactor well 620 from storage tank 630 during a LOCA event as further described herein, the rising water will cause the float 709 to rotate upwards now in a clockwise direction. This simultaneously rotates the flap clockwise and downward opening the nozzle 703 admitting water into the air gaps between the reactor vessel 500 metal shell wall and the stainless steel liners 701.

When the cooling water W from water storage tank 630 enters the air gaps between the liners 701 and comes in contact with the metal reactor vessel 500 wall after the passive reactor cooling system 600 is activated, the water vaporizes producing steam which raises the pressure in the gap. This buildup of pressure forces the flaps 704 of the top flow-hole nozzles 702 to open and relieve the steam build up into the reactor well 620 which is subsequently routed to the heat dissipation ducts 341 of the auxiliary heat dissipation system 340, as further described herein. Accordingly, the cooling water W therefore enters the liners 701 through the open flap(s) 706 of the bottom flow-hole nozzle(s) 703 and is evacuated from the liner assembly through the top flow-hole nozzles 702 in the form of steam.

Referring now to FIGS. 20 and 21, the concrete monolith 621 further defines a large in-containment cooling water storage tank 630 (i.e. within the inner containment vessel 200 also variously shown in FIGS. 1-19). The water tank 630 holds a reserve of cooling water W and is fluidly coupled and positioned to dump its contents into the reactor well 620 in the event of a LOCA. In one embodiment, water storage tank 630 is fluidly coupled to the reactor well 620 by an upper and lower flow conduit 633 in which dump valves 631 are positioned to control flow. At least one flow conduct 633 with dump valve 634 may be provided; however, in some embodiments more than two flow conduits with dump valves may be provided. The dump valve may be operated in a fully opened or closed mode, or alternatively if needed throttled in a partially open mode. During normal power generation operation of the reactor, the dump valves are normally closed to prevent cooling water W from flooding into the reactor well 620 through the flow conduits. The dump valves 631 may be automatically operated via electric or pneumatic valve operators. In one embodiment, the dump valves 631 may be configured to operate as "fail open" when power supply is lost to the valves to automatically flood the reactor well 620 with cooling water W.

In some preferred non-limiting embodiments, the cooling water tank 630 has a volumetric capacity at least as large as or larger than the capacity of the reactor well 620 to optimize cooling the reactor core and replenishing any cooling water W in the reactor well which might be lost as steam to the containment space in designs where the top of the reactor well is either not intentionally fully enclosed and/or tightly sealed or may be damaged.

A method for operating the passive reactor cooling system 600 will now be described with primary reference to FIGS. 20-22. As mentioned earlier in this disclosure, in the case of a LOCA, the pressure and temperature in the containment will rise. When the containment pressure (or temperature) reaches a pre-set threshold value, then the dump valves 631 connecting the water storage tank 630 and reactor well 620 are opened causing a rapid transfer of cooling water W and filling of the reactor well. The insulating liners 701 on the reactor vessel 500 protect it from rapid quenching (and high thermal stresses). After the water in the reactor well 620 reaches near the top flow-hole nozzle 702 in the liner 701 assembly (until then the reactor vessel is undergoing limited cooling thru the heat transfer across the liners to the reactor well water), then the cold cooling water W begins to fill the interstitial spaces between the liners and the reactor vessel thus significantly accelerating the extraction of decay heat from the reactor core 501 and reactor vessel.

After some time, the temperature of the pool of deposited water in the reactor well 620 reaches the boiling point temperature and begins to boil. The steam thus produced rises by buoyancy action through inlet piping 603 to the bank of heat dissipater ducts 341 of the auxiliary heat dissipation system 340, as described above and shown in FIGS. 16, 18, and 21. These ducts 341 condense the steam generated in the reactor well pool and return the condensate to the reactor well 620 via outlet piping 603 with the latent heat of steam delivered to the external annular reservoir 313 holding water having a temperature lower than the steam to form a heat sink in thermal communication with the containment vessel 200. Accordingly, the heat from the spilled reactor cooling system primary coolant water (e.g. via a primary coolant piping failure) is thus removed by the containment, albeit less efficiently, as the water/air mixture rises and contacts the internal surface of the containment (which is equipped with large external and internal fins 220, 221 shown in FIG. 3 and described above) to facilitate the heat extraction.

It should be noted that the flow of steam and condensate between the heat dissipater ducts 341 and reactor well 620 is advantageously driven solely by gravity due to the changing densities of the steam and condensate, without need for pumps and an available power supply. The heat dissipater ducts 341 are therefore preferably positioned on the inner containment vessel 200 wall at higher location than the reactor well 630 and the extraction point of steam from the reactor well. Flow of steam and condensate through the inlet and outlet piping 603 to and from the array of heat dissipater ducts 341 may be controlled by suitable valves 625 (see FIG. 20), which may be operated in an on/off mode, or throttled. Valves 625 may be configured to operate as "fail open" when power supply is lost to the valves which may have electric or pneumatic valve operators. This automatically opens and actuates the closed flow loop of the reactor cooling system 600 between the heat dissipater ducts 341 and reactor well 620.

The inlet steam piping 603 to the heat dissipater ducts 341 may be fluidly coupled to the top portion of reactor well 620 to optimally capture the accumulating steam. The outlet condensate return piping 603 may be fluidly coupled to the top portion of water storage tank 630 to optimally capture the accumulating steam. The atmospheric closed flow loop of the reactor cooling system 600 between the reactor well 620 and heat dissipater ducts 341 may therefore flow through the water storage tank 630 (see FIG. 21).

In the event of a LOCA, as the water inventory in the annular reservoir 313 between the inner containment vessel 200 and outer containment enclosure structure 300 evaporates, it may be readily replenished. However, if replenishment is not possible, then the receding water inventory in the reservoir 313 will actuate rejection of heat to the air by ventilation action using the passive air cooling system 400 described above. Once all the water has evaporated in the reservoir 313, the containment structure will continue to reject heat by air cooling alone. Air cooling after a prolonged period of water cooling is ideally sufficient to remove all the decay heat. This also passive gravity driven heat expulsion process driven by changing air densities can continue as long as necessary to cool the reactor.

It will be appreciated that numerous variations of the foregoing method for operating the passive reactor cooling system 600 are possible.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A passive reactor cooling system usable after a loss-of-coolant accident, the system comprising:
   a containment vessel in direct thermal contact with an external heat sink;
   a reactor well disposed inside the containment vessel;
   a reactor vessel disposed at least partially, in the reactor well, the reactor vessel containing primary coolant and a nuclear fuel core beating the primary coolant which is circulated between the reactor vessel and a steam generator in a closed primary coolant flow loop;
   a cooling water tank disposed inside the containment vessel and containing an inventory of emergency cooling water in selective fluid communication with the reactor well via at least one flow control apparatus, the flow control apparatus having a closed position preventing flow of cooling water to the reactor well and an open position providing flow of cooling water to the reactor well; and
   a heat exchanger comprising a plurality of longitudinally-extending heat dissipater ducts integrally attached directly to an inside surface of the containment vessel in a thermally conductive relationship, the heat exchanger in fluid communication with the reactor well and water tank via a closed cooling water flow loop in which flow is driven via gravity;
   wherein following a loss of primary coolant, the water tank is configured and operable to flood the reactor well with cooling water which is converted into steam by heat from the fuel core and flows through the closed cooling water flow loop to the heat exchanger;
   the steam flowing through the heat dissipater ducts of the heat exchanger and transferring heat to the external heat sink directly through the containment vessel which condenses the steam.

2. The system according to claim 1, wherein the steam condenses in the heat exchanger forming condensate, and the condensate flows via gravity back to the water tank via the closed cooling water flow loop.

3. The system according to claim 2, wherein the condensate flows from the water tank back to the reactor well via the flow control apparatus.

4. The system according to claim 1, wherein the flow control apparatus comprises at least one flow conduit and a dump valve movable between the open and closed positions, the dump valve controlling the flow of cooling water to the reactor well from the cooling water tank through the at least one flow conduit.

5. The system according to claim 2, wherein a top of the reactor well is sealed and enclosed by a closure structure, the closure structure capturing the steam produced in the reactor well which is directed to the heat exchanger via the closed cooling water flow loop by steam inlet piping penetrating the closure structure.

6. The system according to claim 5, wherein the closure structure is formed at least in part by a ring-shaped reactor support, flange attached to and extending circumferentially around a perimeter of the reactor vessel.

7. The system according to claim 5, wherein a top of the cooling water tank is sealed and enclosed, the condensate flowing back to the water tank from the heat exchanger via the closed cooling water flow loop through outlet condensate piping penetrating the enclosed closed top of the cooling water tank.

8. The system according to claim 1, wherein the cooling water tank has a volumetric capacity at least as large as the volumetric capacity of the reactor well to optimize cooling the reactor core during a loss of primary coolant event.

9. The system according to claim 1, wherein the containment vessel comprises a cylindrical metal shell in thermal communication with the external heat sink.

10. The system according to claim 9, wherein the heat dissipater ducts are parallel to each other and circumferentially spaced apart around a circumference of the inner surface of the containment vessel.

11. The system according to claim 1, wherein the heat dissipater ducts are vertically oriented, each heat dissipater duct having upper and lower ends fluidly coupled to a common upper inlet ring header and a common lower outlet ring header attached to the inner surface of the containment vessel.

12. The system according to claim 1, wherein each heat dissipater duct is formed of a half-section of pipe or tube defining parallel longitudinal legs which are seam welded to the interior surface of the containment vessel such that the steam and condensate flowing in each heat dissipater duct is in immediate contact with the interior surface of the containment vessel.

13. The system according to claim 1, wherein the external heat sink comprises an annular reservoir holding water that surrounds and contacts an exterior surface of the containment vessel.

14. The system according to claim 13, wherein the water in the annular reservoir has a temperature lower than the temperature of the steam for condensing the steam.

15. The system according to claim 13, wherein the annular reservoir is formed between the containment vessel and an outer containment enclosure structure.

16. The system according to claim 2, wherein the closed flow loop includes:
inlet steam piping fluidly coupling the heat exchanger to an enclosed top portion of the reactor well which prevents escape of the steam to an environment inside the containment vessel; and
outlet condensate piping fluidly coupling the heat exchanger to an enclosed top portion of the cooling water tank;
wherein the enclosed reactor well and cooling water tank form an integral part of the closed cooling water flow loop.

17. The system according to claim 1, wherein the reactor well and cooling water tank are formed in a concrete monolith disposed in the containment vessel, the reactor well and cooling water tank sharing a common wall therebetween.

18. A passive reactor cooling system usable after a loss-of-coolant accident, the system comprising:
a metal containment vessel comprising a shell in direct thermal contact with an external annular water-filled reservoir which defines an external heat sink;
a monolithic concrete structure disposed inside the containment vessel and defining a reactor well;
a vertically elongated reactor vessel having a lower portion disposed in the reactor well and an upper portion, the reactor vessel containing primary coolant and a nuclear fuel core heating the primary coolant which is circulated between the reactor vessel and a steam generator in a closed primary coolant flow loop;
a cooling water tank disposed inside the containment vessel and containing an inventory of emergency cooling water in selective fluid communication with the reactor well via at least one flow conduit controlled by a dump valve, the dump valve having a closed position preventing flow of cooling water to the reactor well and an open position providing flow of cooling water to the reactor well; and
a heat exchanger comprising a plurality of longitudinal heat dissipater ducts integrally attached directly to an inside surface of the containment vessel shell in a thermally conductive relationship, the heat exchanger in fluid communication with the reactor well and cooling water tank via a closed cooling water flow loop in which flow is driven via gravity;
wherein following a loss of primary coolant, the cooling water tank is configured and operable to flood the reactor well with cooling water which is converted into steam by heat from the fuel core and flows through the closed cooling, water flow loop to the heat dissipater ducts; and
wherein the steam condenses in the heat dissipater ducts via rejection of heat to the external heat sink directly through the containment vessel shell forming condensate which flows via gravity back to the cooling water tank via the closed cooling water flow loop.

19. The system according to claim 18, wherein the cooling water tank is formed in the monolithic concrete structure adjacent the reactor well, the reactor well and cooling water tank sharing a common wall therebetween and the at least flow conduit formed through the common wall.

20. A passive reactor cooling system usable after a loss-of-coolant accident, the system comprising:
a containment vessel in thermal communication with an external heat sink;
a reactor well disposed inside the containment vessel;
a reactor vessel disposed at least partially in the reactor well, the reactor vessel containing primary coolant and a nuclear fuel core heating the primary coolant which is circulated between the reactor vessel and a steam generator in a closed primary coolant flow loop;
a cooling water tank disposed inside the containment vessel and containing an inventory of emergency cooling water in selective fluid communication with the reactor well via at least one flow control apparatus, the flow control apparatus having a closed position preventing flow of cooling water to the reactor well and an open position providing flow of cooling, water to the reactor well; and a heat exchanger attached to an inside surface of the containment vessel, the heat exchanger in fluid communication with the reactor well and water tank via a closed cooling water flow loop in which flow is driven via gravity;

wherein following a loss of primary coolant, the water tank is configured and operable to flood the reactor well with cooling water which is converted into steam by heat from the fuel core and flows through the closed cooling water flow loop to the heat exchanger;

wherein the heat exchanger comprises a plurality of longitudinally-extending heat dissipater ducts integrally attached to the containment vessel and in thermal communication with the external heat sink via the containment vessel;

wherein each heat dissipater duct is formed of a half-section of pipe or tube defining parallel longitudinal legs which are seam welded to the interior surface of the containment vessel such that the steam and condensate flowing in each heat dissipater duct is in immediate contact with the interior surface of the containment vessel.

* * * * *

UNITED STATES PATENT AND TRADEMARK OFFICE
CERTIFICATE OF CORRECTION

| | | |
|---|---|---|
| PATENT NO. | : 10,665,354 B2 | Page 1 of 1 |
| APPLICATION NO. | : 15/901249 | |
| DATED | : May 26, 2020 | |
| INVENTOR(S) | : Krishna P. Singh et al. | |

It is certified that error appears in the above-identified patent and that said Letters Patent is hereby corrected as shown below:

In the Claims

Claim 1, Column 22, Line 37: after the word "core" and before the word "the" please change "beating" to -- heating --.

Signed and Sealed this
Tenth Day of May, 2022

*Katherine Kelly Vidal*

Katherine Kelly Vidal
*Director of the United States Patent and Trademark Office*